(12) United States Patent
Makhija et al.

(10) Patent No.: US 11,757,808 B2
(45) Date of Patent: Sep. 12, 2023

(54) DATA PROCESSING FOR ENTERPRISE APPLICATION CHATBOT

(71) Applicant: NB Ventures, Inc., Clark, NJ (US)

(72) Inventors: Subhash Makhija, Westfield, NJ (US); Saratendu Sethi, Apex, NC (US); Manas Ranjan Goth, Maharashtra (IN); Gaurav Dua, Uttar Pradesh (IN); Shivendra Singh Malik, Vasco-da-Gama (IN)

(73) Assignee: NB Ventures, Inc., Clark, NJ (US)

( * ) Notice: Subject to any disclaimer, the term of this patent is extended or adjusted under 35 U.S.C. 154(b) by 115 days.

(21) Appl. No.: 17/494,294

(22) Filed: Oct. 5, 2021

(65) Prior Publication Data

US 2023/0110941 A1 Apr. 13, 2023

(51) Int. Cl.
*H04L 5/02* (2006.01)
*G06N 20/00* (2019.01)
*G06F 40/30* (2020.01)
*H04L 51/02* (2022.01)
*G06Q 10/087* (2023.01)

(52) U.S. Cl.
CPC .............. *H04L 51/02* (2013.01); *G06F 40/30* (2020.01); *G06N 20/00* (2019.01); *G06Q 10/087* (2013.01)

(58) Field of Classification Search
CPC ....... H04L 51/02; G06F 40/30; G06F 40/284; G06N 20/00; G06Q 10/087
See application file for complete search history.

(56) References Cited

U.S. PATENT DOCUMENTS

| | | | |
|---|---|---|---|
| 2019/0370342 A1* | 12/2019 | Luke | G06N 5/046 |
| 2022/0067746 A1* | 3/2022 | Thakkar | H04L 51/02 |
| 2022/0385703 A1* | 12/2022 | Joshi | H04L 51/02 |
| 2023/0004948 A1* | 1/2023 | Earley | G06F 40/131 |

* cited by examiner

*Primary Examiner* — Soe Hlaing
(74) *Attorney, Agent, or Firm* — David M. Breiner; BrownWinick Law Firm

(57) ABSTRACT

The present invention relates to a data processing system and method for enterprise application chatbot. The invention identifies the intent of a data string or an SCM action executed on the enterprise application using AI engine for predicting the relevant data to be extracted by the chatbot from the database and presenting the same on the chatbot interface for enabling a user to take an informed decision.

28 Claims, 16 Drawing Sheets

| User Query | Intent |
|---|---|
| I want to fix a water leak. | Recommend Suppliers |
| How can I buy 50 laptops? | Channel selector |
| I want to create an AMC contract. | Create document |
| How do I acknowledge a purchase order? | Help desk |
| What is the spend for suppliers by categories across region for this year? | Report |
| Hello what is your name? | Small Talk |

DATA PROCESSING FOR ENTERPRISE APPLICATION CHATBOT

BACKGROUND

1. Technical Field

The present invention relates generally to enterprise applications. More particularly, the invention relates to a chatbot for Supply chain management (SCM) enterprise application.

2. Description of the Prior Art

In any digital set up, chatbots play a critical role in meeting the requirements of a user. Depending on the complexity of the application to be supported, the chatbots are structured to enable maximum efficiency. However, certain chatbots are not trained enough to respond accurately. Moreover, human intervention is always required when the chatbot is unable to meet the requirement of the user. Every organization strives to develop a chatbot that enables resolution of maximum queries even if the organization is spread with functions in multiple domains.

One prior art U.S. Ser. No. 10/841,251B1, discloses a multi-domain chatbot that includes an automated agent which may receive the message from the user, determine an intent of the message, and based on the intent, determine a group of the domain-specific modules that should be investigated. The automated agent may then investigate the group of domain-specific modules by sending the user message to and receiving responses from the domain-specific modules within the group. This is a structured approach of investigating domain-specific modules. However, for enterprise application such as a supply chain management application, this approach is not feasible. In supply chain application, there are multiple sub application working with real time data with cross functions supporting each other. For eg: a change in PO (Purchase order) impacts invoice, inventory, warehouse etc. Also, data processing in supply chain management application requires processing of multiple set of data to respond to a user requirement. Further, with complex enterprise applications, a chatbot requires predictive approach for analyzing a query before initiating a processing task to be executed for responding to the query to meet the requirement.

Further, there are unique challenges with chatbots for enterprise applications developed on codeless platform due to the inherent nature of the development framework. The architecture remains unsupportive in multiple aspects including dynamic workflows. The basic structure of applications supporting such development have inherent issues due to the complexity of the functions to be executed in supply chain management applications, which makes it impossible for a chatbot to respond accurately to a user query or action. None of the prior arts address the structural complexity and technical issues in executing chatbot functions through an enterprise application that are supported by existing architecture designs and infrastructure.

In view of the above problems, there is a need for a system and method of data processing for enterprise application chatbot that responds accurately and effectively to any requirement originating from a user or any enterprise application. Moreover, there is a need for a chatbot that is supportive to any enterprise application whether developed on codeless platform or any existing platform that can overcome the problems associated with the prior arts.

SUMMARY

According to an embodiment, the present invention a method for enterprise application chatbot. The method includes receiving one or more data strings or initiation of an SCM action from a user through an electronic user interface of the enterprise application, parsing intent of the user from the received one or more data string or the SCM action by a processor coupled to an AI engine wherein one or more one data scripts are identified based on the parsed intent to trigger one or more processing task, embedding the one or more processing task specific data on the identified data script to generate one or more relevant data, and sending the one or more relevant data by the chatbot to the enterprise application interface in response to the received one or more data strings or the SCM action for enabling the user to make an informed decision, wherein the one or more data scripts executes the processing task based on at least one data model trained on one or more historical dataset for predicting and extracting the one or more relevant data from a historical database.

In an embodiment, the present invention provides a data processing system configured for enterprise application chatbot. The system includes a server configured to receive one or more data strings or initiation of an SCM action from a user through an electronic user interface of the enterprise application, a processor coupled to an AI engine for parsing intent of the user from the received one or more data strings or the SCM action wherein one or more data scripts are identified based on the intent of the user to trigger one or more processing task, wherein the processor is configured to embed the one or more processing task specific data on the identified data script to generate one or more relevant data and send the one or more relevant data by the chatbot to the enterprise application in response to the received one or more data strings or the SCM action for enabling the user to make an informed decision, wherein the one or more data scripts execute the one or more processing tasks based on at least one data model trained on a historical dataset for predicting and extracting the one or more relevant data from a historical database.

In a related embodiment, the at least one data model is generated based on data enrichment of historical dataset, wherein a method of data enrichment includes the steps of receiving a labelled dataset, cleansing the received labelled dataset by removal of special characters, tokenization of labelled dataset after removal of special characters and removal of stop words from the labelled dataset to obtain a normalized dataset, dividing the normalized dataset into training dataset and testing dataset, subjecting the training dataset to fine tuning by a bidirectional machine learning technique (MLT) on top of a reading comprehension dataset, generating the one or more data model based on the training dataset and the testing dataset, generating a prediction dataset for the testing dataset using the training data set through the one or more data models, providing the prediction dataset as input to a neural network and testing data as output to identify one or more data attribute weights for determining accuracy of the prediction dataset and in response to determination of accuracy to be above a threshold value, storing the dataset in the historical database.

In another embodiment, wherein the bidirectional machine learning technique includes deep learning models configured to mask one or more elements of the dataset and enhance remaining elements of the dataset for processing wherein the elements for processing are identified by contextual analysis of the dataset.

In an embodiment, the present invention provides a computer program product for data processing for enterprise application chatbot on a computing device with memory. The product includes a computer readable storage medium readable by a processor and storing instructions for execution by the processor for performing the above method.

In an advantageous aspect, the system and method of the invention structures the data model trained through AI (artificial intelligence) driven processing to ensure processing of minimal data with parallelization method for faster processing by the computing systems. Further, the present invention utilizes Machine Learning algorithms, deep learning models and contextual analysis of datasets.

BRIEF DESCRIPTION OF THE DRAWINGS

The disclosure will be better understood and when consideration is given to the drawings and the detailed description which follows. Such description makes reference to the annexed drawings wherein:

FIG. 4 is a table showing sample data strings related to enterprise application supply chain management (SCM) functions in accordance with an embodiment of the invention.

DETAILED DESCRIPTION

Figure 1:
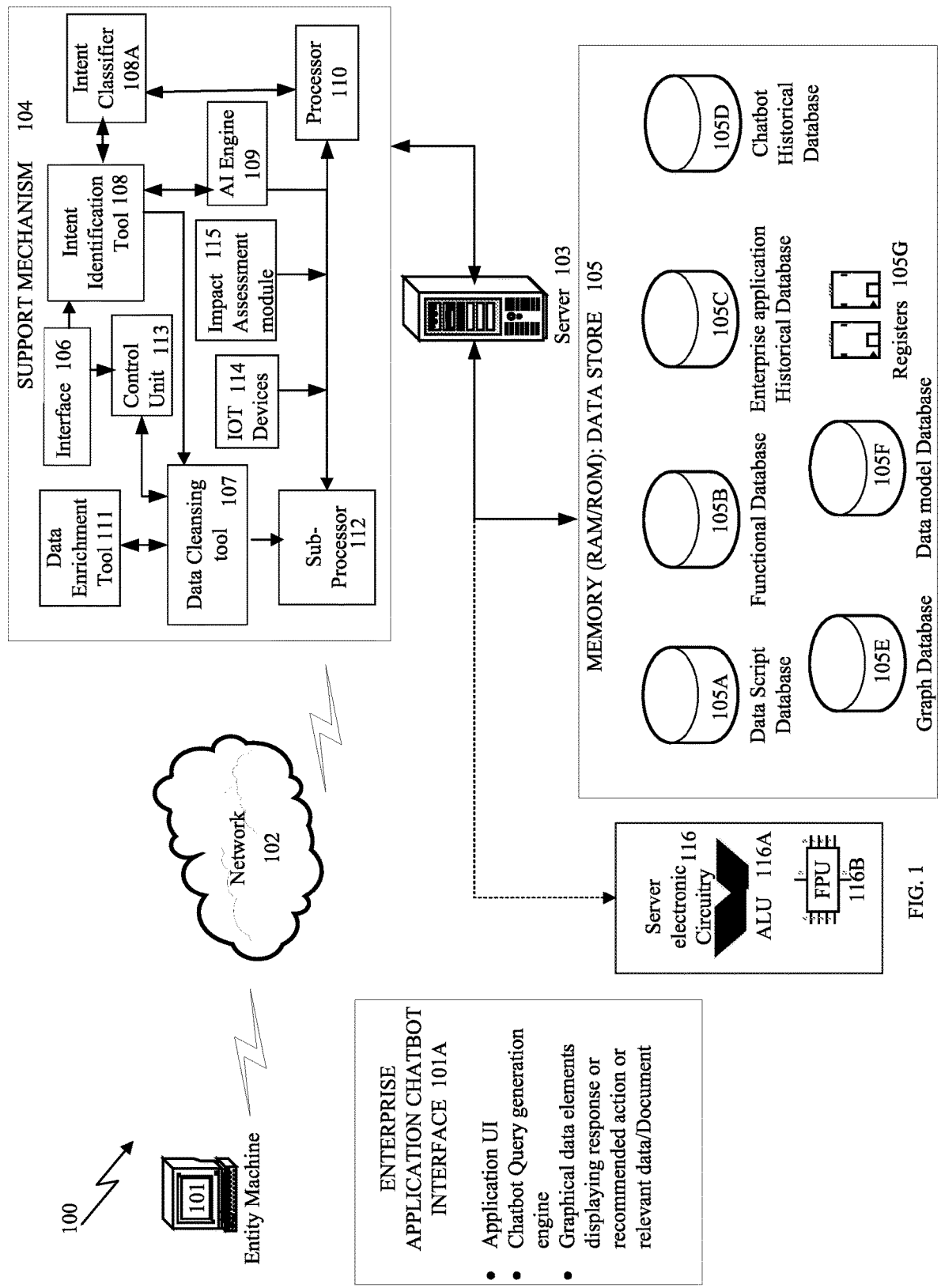
FIG. 1 is a system diagram of a data processing system for an enterprise application chatbot in accordance with an example embodiment of the invention.
Figure 1A:
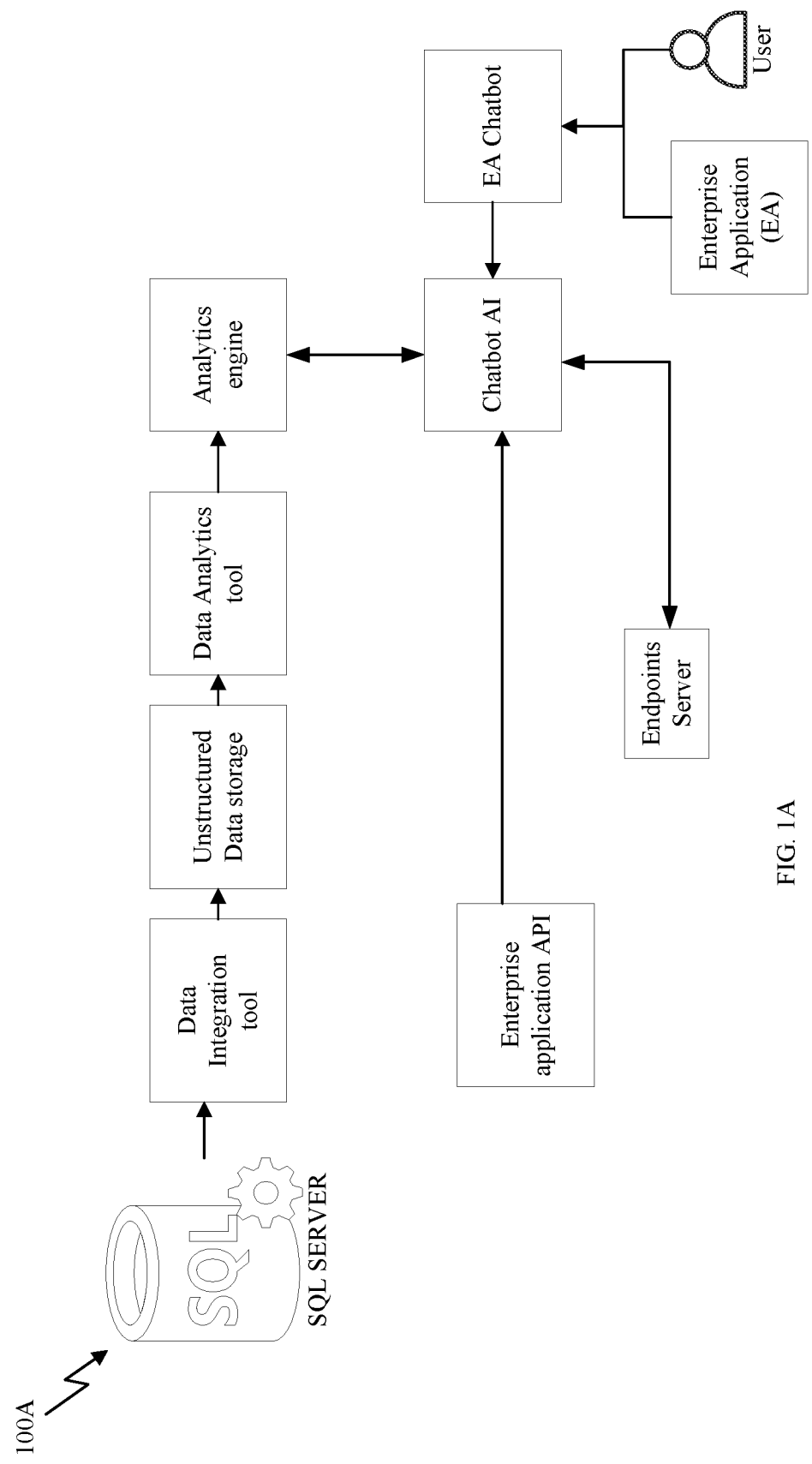
FIG. 1A is a system architecture and flow diagram of the data processing system for the enterprise application chatbot in accordance with an embodiment of the invention.

Described herein are the various embodiments of the present invention, which includes data processing system and method for enterprise application chatbot.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "training dataset," "testing dataset," or "data model", and the like, may be used herein for ease of description to describe one element or feature's relationship to another element(s) or feature(s) as illustrated in the figures. It will be understood that the spatially relative terms are intended to encompass different workflows of the process in use or operation in addition to the workflows depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to data processing system and method for enterprise application chatbot.

Referring to FIG. 1, a data processing system for data processing is provided in accordance with an embodiment of the present invention. The system 100A includes at least one entity machine 101 configured to process data received through an enterprise application chatbot interface 101A. The chatbot interface 101A includes an application UI, a chatbot query generation engine and a plurality of graphical data elements displaying response or recommended action or relevant data/document. The machine 101 is further configured for sending data over a network 102. The system further includes a server 103 configured to receive the data from the entity or an automated SCM action executed by a bot working with the SCM application. The system 100 includes a support mechanism 104 for performing data processing functions depending upon the type of entity i.e a user or an automated SCM action and the type of data received at the server 103. The system 100 includes a memory data store 105 for accessing enterprise application historical data, chatbot historical data and also storing plurality of training data models and data scripts created by support mechanism 104.

In an embodiment the server 103 of the invention may include various sub-servers for communicating and processing data across the network. The sub-servers include but are not limited to content management server, application server, directory server, database server, mobile information server and real-time communication server.

In an embodiment the entity machine 101 may communicate with the server 103 wirelessly through communication interface, which may include digital signal processing circuitry. Also, the entity machine 101 may be implemented in a number of different forms, for example, as a smartphone, computer, personal digital assistant, or other similar devices. The entity machine 101 is configured to process enterprise application data and receive data through EA interface 101A having application UI, chatbot query generation engine, Graphical data elements displaying response or recommended action or relevant data/Document etc.

In an example embodiment, the support mechanism 104 of the system 100 includes a communication interface 106 for accessing information received at the server 103. The support mechanism further includes a data cleansing and normalization tool 107 for cleansing and normalizing data already available with the data store 105 of the system 100 and also cleansing of the received data at the server 103. The support mechanism 104 includes an intent identification tool 108 and an intent classifier 108A configured for identification of intent from the received data based on a reference library generated by an AI engine 109 coupled to a processor 110. The AI engine 109 processes a historical dataset of conversational and functional data to generate the reference library related to SCM actions. The processor 110 is configured for performing various functions including but not limited to process normalized dataset through actions including but not limited to tokenization and vectorization to generate vectors. Further, the processor 110 is configured for enabling normalization of received data depending on a set of training models. The AI engine 109 is configured to integrate a set of data scripts and classify received data with identifiers. The data scripts are identified based on the intent to trigger one or more processing tasks.

The AI engine 109 integrates deep learning, predictive analysis, information extraction, planning, scheduling, impact analysis and robotics for analysis of the data string or SCM action to determine the intent.

In an exemplary embodiment, the data processing system includes a plurality of bots including chatbots and other data processing bots configured to automate SCM related processing tasks. The support mechanism may include hardware components or software components or a combination of hardware and software components integrating multiple data objects through one or more applications implemented on a cloud integration platform.

In an embodiment, the software component as a bot may be a computer program enabling an application to integrate with distinct data source devices and systems by utilizing Artificial intelligence and blockchain networks. The hardware includes the memory, the processor, control unit and other associated chipsets especially dedicated for performing recalibration of data models to carry out functions for EA when triggered by the bots.

In a related embodiment, for enrichment of enterprise application historical data and chatbot historical data through mapping of the historical data by the normalized dataset the support mechanism 104 of the system 100 further includes a data enrichment tool 111. The system 100 also includes a sub-processor 112 configured for processing the received data string or a data object related to initiation of an SCM action by analyzing before mapping the historical data. The mapping of the historical data is executed by a bot through a data mapping script. The support mechanism 104 includes a control unit 113 encoded with instructions enabling the control unit to function as a bot for identifying and selecting an AI based dynamic processing logic using to execute one or more processing tasks.

In an embodiment, the support architecture 104 includes one or more IOT devices 114 configured to provide the inputs to the server on initiation of the SCM action wherein the IOT devices include sensor, mobile, camera, Bluetooth, RF tags and similar devices or combination thereof. Further, the inputs may include but is not limited to inventory management data or warehouse management data or data related to one or more item for procurement or performance data of procured items.

In an embodiment, the support architecture 104 includes a real-time impact assessment module 115 configured to receive impact data including data or information related to natural calamity, fluctuation in market indices, social sentiments, logistics, political crisis and policy changes through labor laws, taxation, economy, import & export policies, international trading laws, customer satisfaction survey and technology improvements, etc., that may impact one or more functionalities associated with the enterprise application.

In example embodiment the server 103 shall include electronic circuitry 116 for enabling execution of various steps by the processor. The electronic circuitry has various elements including but not limited to a plurality of arithmetic logic units (ALU) 116A and floating-point Units (FPU) 116B. The ALU enables processing of binary integers to assist in formation of a cluster matrix of variables where the data training model is applied to the matrix for obtaining confidence score of the cluster. In an example embodiment the server electronic circuitry 116 as shown in FIG. 1, includes at least one Arithmetic logic unit (ALU) 116A, floating point units (FPU) 116B, other processors, memory, storage devices, high-speed interfaces connected through buses for connecting to memory and high-speed expansion ports, and a low-speed interface connecting to low-speed bus and storage device. Each of the components of the electronic circuitry 116, are interconnected using various busses, and may be mounted on a common motherboard or in other manners as appropriate. The processor can process instructions for execution within the server 103, including instructions stored in the memory or on the storage devices to display graphical information for a GUI on an external input/output device, such as display coupled to high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The processor 110 may be implemented as a chipset of chips that include separate and multiple analog and digital processors. The processor 110 may provide coordination of the other components, such as controlling user interfaces, applications run by devices, and wireless communication by devices.

The Processor 110 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor 110, so as to enable near area communication of device with other devices. External interface may provide, for example, for wired communication in some implementations, or for wireless communication in other implementations, and multiple interfaces may also be used.

Referring to FIG. 1, the various elements like the support mechanism 104, the memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the memory data store 105 either alone or in various combinations may be part of a server system as other external connections.

In an example embodiment, the memory data store 105 includes plurality of databases as shown in FIG. 1. The data store 105 includes a data script database 105A for storing dynamically generated data scripts configured for performing one or more processing task by utilizing a library of functions stored on a functional database 105B. Further the data scripts also enable mapping of received data string or data object related to SCM action, to data set in enterprise application historical database 105C and chat dataset of a chatbot historical database 105D by processing at least one data attribute associated with received dataset based on a dynamic processing logic. The data store 105 includes a graph data base 105E configured for storing graph structures for semantic queries with nodes, edges and properties to represent and store data, a data model database 105F configured for storing a plurality of training models required to process the received data for identifying intent and generating relevant data. The data models database 105F stores a plurality of data models configured for cleaning and normalization of datasets received from a user or initiation of SCM action through the enterprise application. The data store 105 also includes a plurality of registers 105G as part of the memory data store 105 for temporarily storing data from various databases to enable transfer of data by the processor 110 between the databases as per the instructions of the AI engine 109 to enable processing of received data string and generation of relevant data with recommended action in response to initiation of an SCM action through the enterprise application.

In a related embodiment, the data scripts are backend scripts created by the bot based on the intent of the received data string or initiation of the SCM action and AI processing for enabling automation of the processing tasks.

The memory data store 105 may be a volatile, a non-volatile memory or memory may also be another form of computer-readable medium, such as a magnetic or optical disk.

The memory store 105 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an embodiment, the enterprise application (EA) historical database 105B includes information about the historical dataset related to one or more functions executed through the enterprise application. The historical dataset may be related to one or more nodes of the enterprise application depending on the complexity of the functions to be executed. For eg: the EA historical database 105B may include data related to past PO (Purchase order), Supplier data, Inventory data, Warehouse data, etc. Depending on the identified intent of the user or the initiation of the SCM action, the chatbot is configured to recommend action on the interface based on relevant data extracted through the EA historical database 105B. The data script database 105A includes dynamically generated data models related to at least one historical data in the historical database 105B. One or more data script is created by the bots based on at least one data subset and a cleansed enriched data stored in the historical database 105B. Further, the chatbot historical database 105E enables determination of the intent of the received data string from the user or through initiation of the SCM action on the interface.

In an exemplary embodiment, the data store 105 is configured for storing historical datasets related to operations including inventory management, delivery management, transportation management, work order management, demand and supply planning, forecast, purchase order and invoice, real-time streams from manufacturing devices and consumer preference in regions, feeds from weather, social sentiments, economic and market indices.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the received data string is data string querying about one or more functions, objects or recommended action to related to SCM enterprise application. The object may include any data object including but not limited to data related to an item, a supplier data or a data string extracted from at least one data source.

In an exemplary embodiment the system is configured to process complex operations of one or more SCM applications using configurable components of each layer of a codeless platform architecture. The layered architecture enables faster processing of complex operations as the workflow may be reorganized dynamically using the configurable components. The present invention uses Artificial intelligence, Orchestration and layered platform architecture where the entire operational logic is transformed into engine reducing complex logic for retrieval of required information to enable execution of tasks. The chatbot is structured to accommodate for querying additional databases or files created in real time by users of enterprise application. Moreover, the enterprise application may be built on codeless platform with configurable components enabling restructuring of the application. The chatbot is configured to process data from the enterprise application that may have been restructured in real time by a user. The AI engine enables translation of any sequence flow in the engine. It is very helpful to manage processing of query or execution of SCM action in multitenant applications. The platform includes both backend and frontend components (UI components, rules engine and workflow) being built in real time which presents processing challenges for the system as new data may have to be processed more frequently.

In an exemplary embodiment, a system architecture and flow diagram of the data processing system 100A for the enterprise application chatbot is provided in accordance with an embodiment of the invention. The system 100A includes a SQL server, data integration tool, unstructured data storage, data analytics tool, analytics engine, a chatbot AI of the enterprise application (EA) chatbot, an EA API, an endpoints server configured to provide endpoints to retrieve trackers of conversations or SCM scenarios as well as endpoints to modify them, and one or more data string source including a user interacting with the chatbot interface or initiation of an SCM action on the EA. The data string is received at the server from the Users or initiation of the SCM action. The query in the data string is parsed by EA chatbot instance through chatbot API instances. The Chatbot API connects to Analytics engine to detect intent and internal knowledgebase (viz. SQL database) to disambiguate the query and the Chatbot API calls application endpoints to serve the query.

Figure 2:
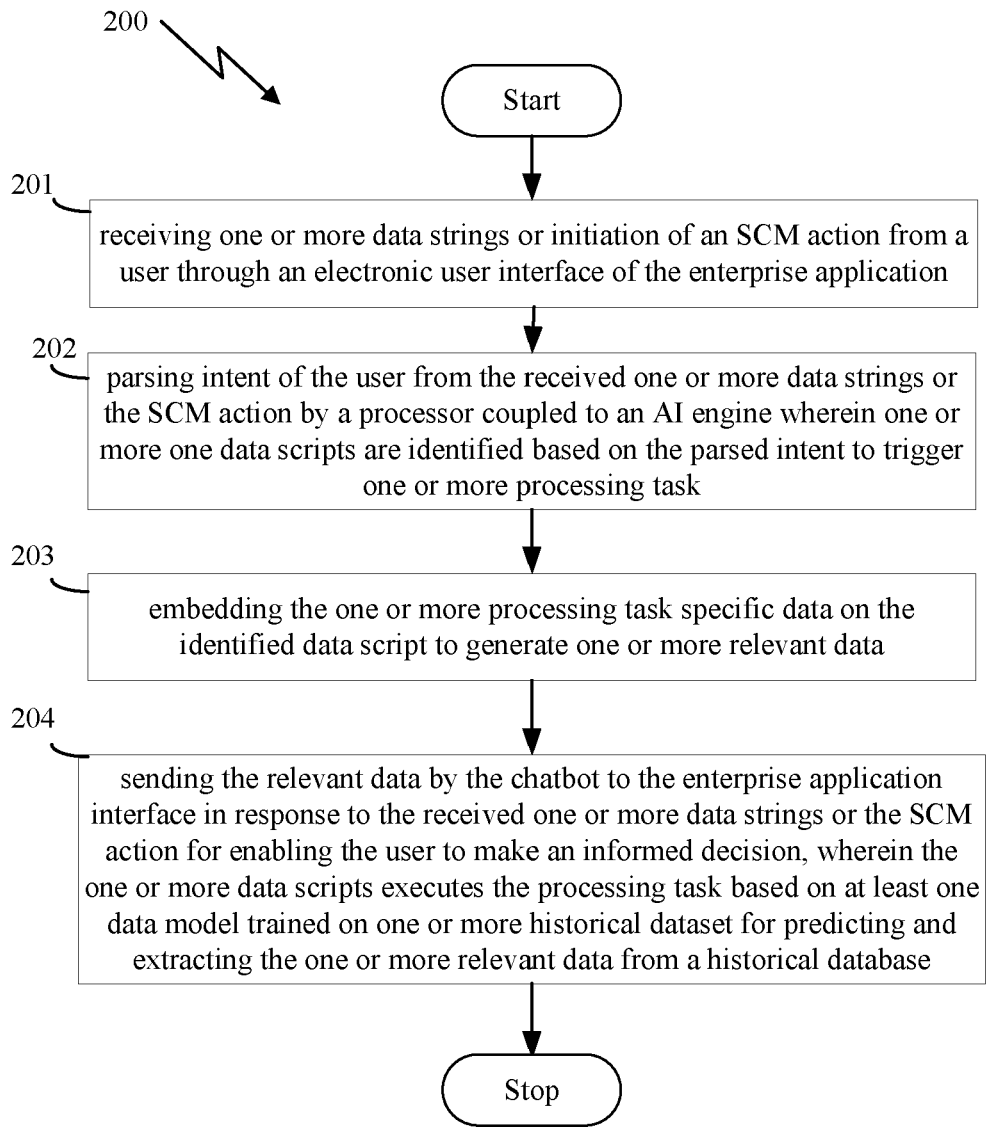
FIG. 2 is a flowchart depicting a data processing method for an enterprise application chatbot in accordance with an embodiment of the invention.

Referring to FIG. 2 a flowchart 200 depicting a data processing method for an enterprise application chatbot is provided in accordance with an embodiment of the invention. The method includes the step 201 of receiving one or more data strings or initiation of an SCM action from a user through an electronic user interface of the enterprise application. In step 202, parsing intent of the user from the received one or more data string or the SCM action by a processor coupled to an AI engine wherein one or more one data scripts are identified based on the parsed intent to trigger one or more processing task. In step 203, embedding the one or more processing task specific data on the identified data script to generate one or more relevant data and in step 204 sending the one or more relevant data by the chatbot to the enterprise application interface in response to the received one or more data strings or the SCM action for enabling the user to make an informed decision, wherein the one or more data scripts executes the processing task based on at least one data model trained on one or more historical dataset for predicting and extracting the one or more relevant data from a historical database.

In an embodiment, parsing intent of the user based on the SCM action includes predicting one or more SCM Scenarios intended to be executed by the user wherein the bot identifies one or more nodes of a SCM network linked to the SCM action and the one or more SCM scenarios for parsing the intent. Further, one or more dataset elements associated with the SCM action executed on the interface are analyzed by the bot to determine accuracy of the predicted one or more SCM Scenarios.

The data string and the initiated SCM action are inputs to the processor as a text input, a voice input, an image input or a combination thereof. The data string or the action is mapped to a feature space that captures a syntactic and a semantic meaning where, a word embedding is trained where one or more words of the data string or words of the action description is mapped to a vector and a Recurrent Neural Network (RNN) is implemented to perform multiclass classification where each class corresponds to at least one intent.

In an embodiment, the relevant data includes recommended action based on processing of supply chain historical data, notification to a user or an auto-task processing object of the enterprise application for enabling the bot to trigger an action based on content of the notification, approvals through SCM data objects in SCM applications.

In an embodiment, the at least one data model is generated based on data enrichment of enterprise application historical dataset, where the method of data enrichment includes receiving a labelled dataset, cleansing the received labelled dataset by removal of special characters, tokenization of labelled dataset after removal of special characters and removal of stop words from the labelled dataset to obtain a normalized dataset; dividing the normalized dataset into training dataset and testing dataset; subjecting the training dataset to fine tuning by a bidirectional encoder machine learning technique (MLT) including an ensemble of data models, where the MLT includes but is not limited to bidirectional encoder representation on transformer etc. The bidirectional encoder MLT is fine-tuned on top of a reading comprehension dataset, generating the one or more data model based on the training dataset and the testing dataset, generating a prediction dataset for the testing dataset using the training data set through the one or more data models, providing the prediction dataset as input to a neural network and testing data as output to identify one or more data attribute weights for determining accuracy of the prediction dataset; and in response to determination of accuracy to be above a threshold value, storing the dataset in the historical database (including enterprise application historical database and chatbot historical database).

In another related embodiment, the at least one data model is trained by extracting a plurality of categories from the normalized dataset for creating taxonomy of classification, extracting a plurality of distinct words from the normalized dataset to create a list of variables, transforming the normalized dataset into a training data matrix using the list of variables, and creating a training data model from the classification code vectors and the training data matrix by using the machine learning engine (MLE) and the AI engine for training the at least one data model.

In an embodiment, the bidirectional encoder machine learning technique includes deep learning models configured to mask one or more elements of the dataset and enhance remaining elements of the dataset for processing wherein the elements for processing are identified by contextual analysis of the dataset.

In another embodiment, the reading comprehension dataset enables processing of unknown elements from the identified elements of the dataset wherein the AI engine processes the labelled dataset with known and unknown elements.

In an exemplary embodiment, the enterprise application chatbot process data in real time to provide accurate and updated response to a query or SCM action. The chatbot receives real time data by one or more IOT devices communicatively connected to the server. For eg: If the user intends to initiate a PO (Purchase order) action, and the inventory management function of the enterprise application provides a real time data that the previous inventory has issues with the supplier or the items are missing or the quality of the items aren't good or an IOT device placed in the warehouse senses discrepancy with any data related to the item intended to be procured by the user, then the Chatbot would generated the relevant data on the interface and also a recommended action like replacing the supplier with another one or replacing the item of one brand with another, etc.

In an example embodiment, the IOT device may be a tracking device, an intelligent sensor, a smartphone, a voice controller, an image capturing device, a gesture controller, a smart watch or a combination thereof. The IOT device may include sensor processors with internal circuitry that may include processor, memory and storage device. The IOT device data includes sensor data on plant machinery, logistics carriers, security systems, warehouse cameras and sensors etc.

In an exemplary embodiment, an IOT device may send an image as an input to the chatbot on the interface. The chatbot is configured to process an image data received at the server, whether JPG, PNG or PDF files. The received data may be obtained from a document that requires conversion to extract the data. Any document like a PDF or JPG file would require conversion of images to text to obtain a data string which is then utilized for classification. Optical character recognition (OCR) techniques for conversion of a document like say invoice is used where computer vision and AI engine are configured for processing the invoice document to obtain the data. Since, OCR may have multiple accuracy issues at the time of extraction of data, the system of the present invention deploys an AI based processing of the extracted data to determine accuracy of extraction before the data is send for intent determination. For eg: a user may click a label on an inventory block or package and send it to the chatbot. The chatbot will perform OCR data extraction, normalize the extracted data, classify the normalized data before processing it for intent determination. The user may want to know if the location of the inventory lot to which the package belongs. The chatbot will process the EA database to determine the relevant data and send the location of the inventory lot to the user and the user can then place the package to the related inventory lot location. Also, if the inventory lot has already been shipped and the package is left behind, the AI engine of the chatbot would covey the relevant information to the user and also recommend further actions, like including the package to a new lot which may be scheduled to be shipped in next cycle. This way, the Chatbot not only processes the information to identify the possible intent in a SCM scenario, but it also recommends multiple solutions to the user, thereby processing multiple scenarios and datasets at the same time to reduce processing times of the processor to improve the functioning of the computing system itself.

In a related embodiment, data extraction from documents such as invoice, PO, or images of labels etc., with multiple characters or words or symbols is a tedious task. The data processing method of the present invention includes a region of interest script configured for identifying data attributes associated with the data object in the document where the region of interest script draws bounded box around the data attributes of the data object before cropping the data attributes in the drawn box and converting the data attributes to text for data extraction. The cropping could be done for any dataset in the supply chain application including supplier name, address, supplier data attributes, item data attributes, or any data string etc. If an invoice document with a supplier is sent to the chatbot where the document template may be new or has already been worked on, then the attributes are identified using a region of interest (ROI) approach. The data object is then sent to OCR for image to text conversion. The text is searched for keywords matching header attributes. For addresses, a bounding box is drawn from the matching header keyword. This bounding box is drawn from the matching header keyword. The bounding box is cropped from the image and sent to an OCR for image to text. Pre-validations done on the extracted data before sending it for intent determination.

In a related embodiment, all the header fields extracted from an invoice document are successfully matched with the master tables. All the line items for a corresponding PO number are successfully matched with the Purchase Order tables.

In an exemplary embodiment, the AI based application takes the data object as an input, the invoice tables extract header and line level information from the invoices and sends the extracted text to the mapping layer. The mapping layer refers to the master tables and maps the extracted text with confidence thresholds and sends the mapped IDs back to the processor for further processing to identify the intent and extract relevant data from EA historical database.

In another exemplary embodiment, the chatbot is connected to a real-time impact assessment module of the enterprise application, where the impact assessment module factors multiple aspects like weather, newsfeeds etc, that may impact the purchasing or procurement abilities of an organization. Depending on the impact of such factors on the enterprise application, the chatbot recommends the appropriate action or generates the relevant data as graphs on the interface to enable a user to take informed decision.

In an embodiment, the system and method of the present invention may execute multiple processing tasks. The processing task includes but is not limited to data analytics task (including spend analytics task), inventory management task, fault detection in SCM data objects such as Purchase orders, contract data processing for assessment of supplier compliance, commodity monitoring for negotiations, warehouse and inventory management, identification of duplicate data, order management, planning and optimization of logistics, opportunity finders, purchase fraud detection, and price negotiation of items or collections of items.

Figure 3:
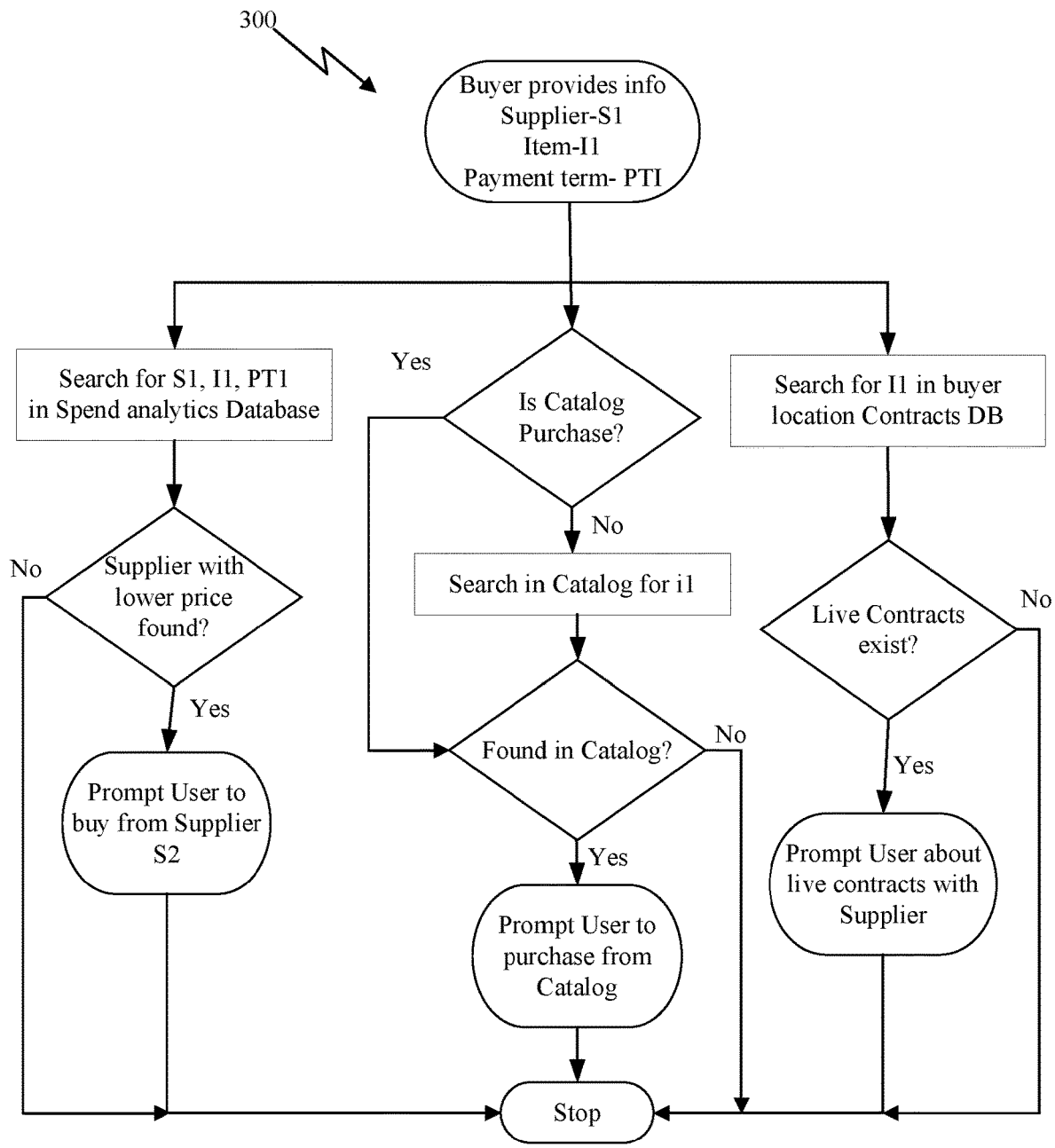
FIG. 3 is a flowchart depicting an opportunity finders processing task executed by the chatbot in accordance with an embodiment of the invention.

Referring to FIG. 3, a flowchart 300 depicting an opportunity finders processing task is shown in accordance with an embodiment of the invention. The buyer places an order from Supplier S1 for item I1 with Payment Term (PT) PT1. The chatbot can leverage spend analytics system of the enterprise application to notify the user about multiple aspects including but not limited to, the same item has been purchased from Supplier S2 at lower price, in case of a non-catalog purchase, chatbot can notify user that the item is present in catalog and prompt user to prefer purchasing the item from catalog, or the chatbot can access contract data, to identify live contracts with suppliers in the same location.

Figure 3A:
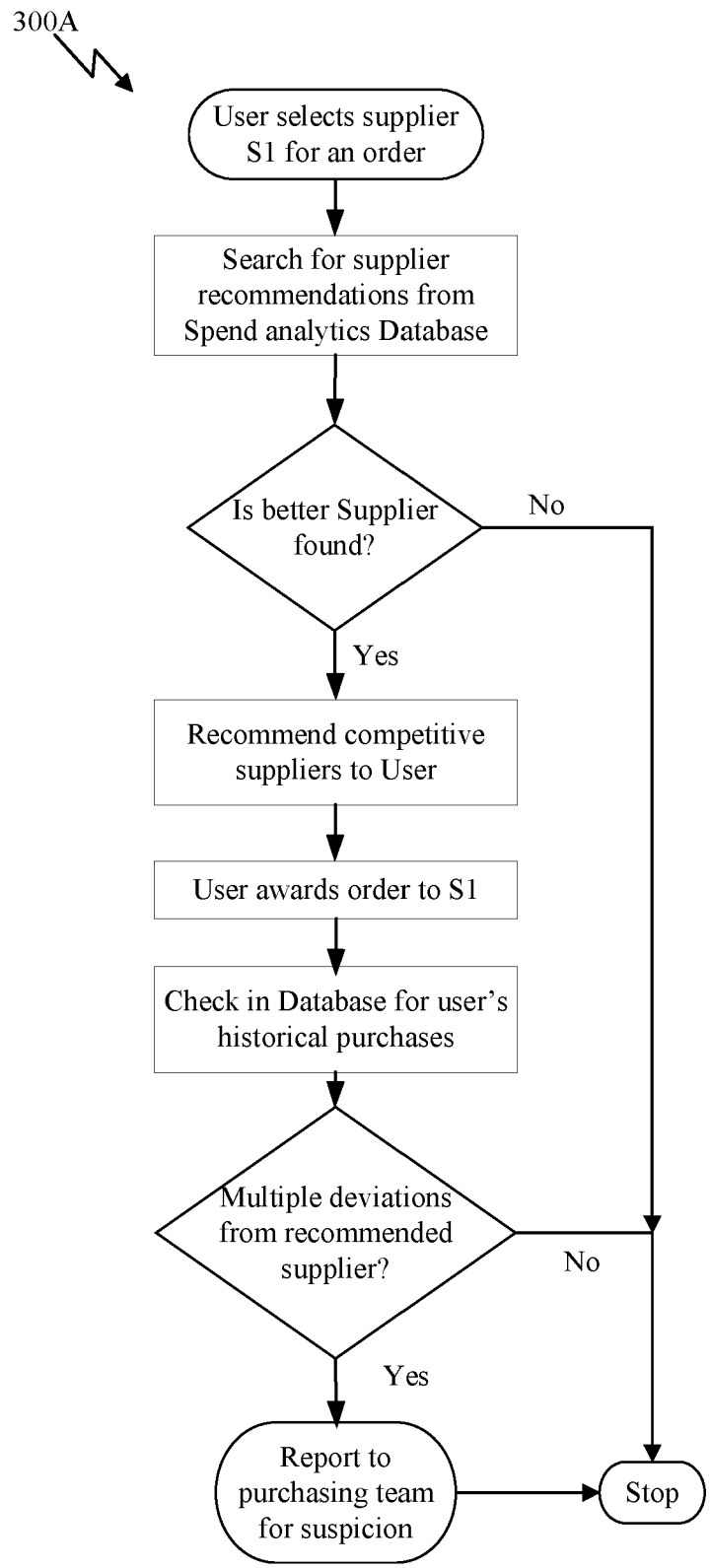
FIG. 3A is a flowchart depicting a fraud detection processing task executed by the chatbot in accordance with an embodiment of the invention.

Referring to FIG. 3A, a flowchart 300A depicting fraud detection processing task is shown in accordance with an embodiment of the invention. If user is repetitively awarding purchase of goods to a particular supplier in-spite of the chatbot recommending competitive suppliers, then such cases can be highlighted to Purchase admin team to check the reasoning behind the same.

Figures 3B, 3C:
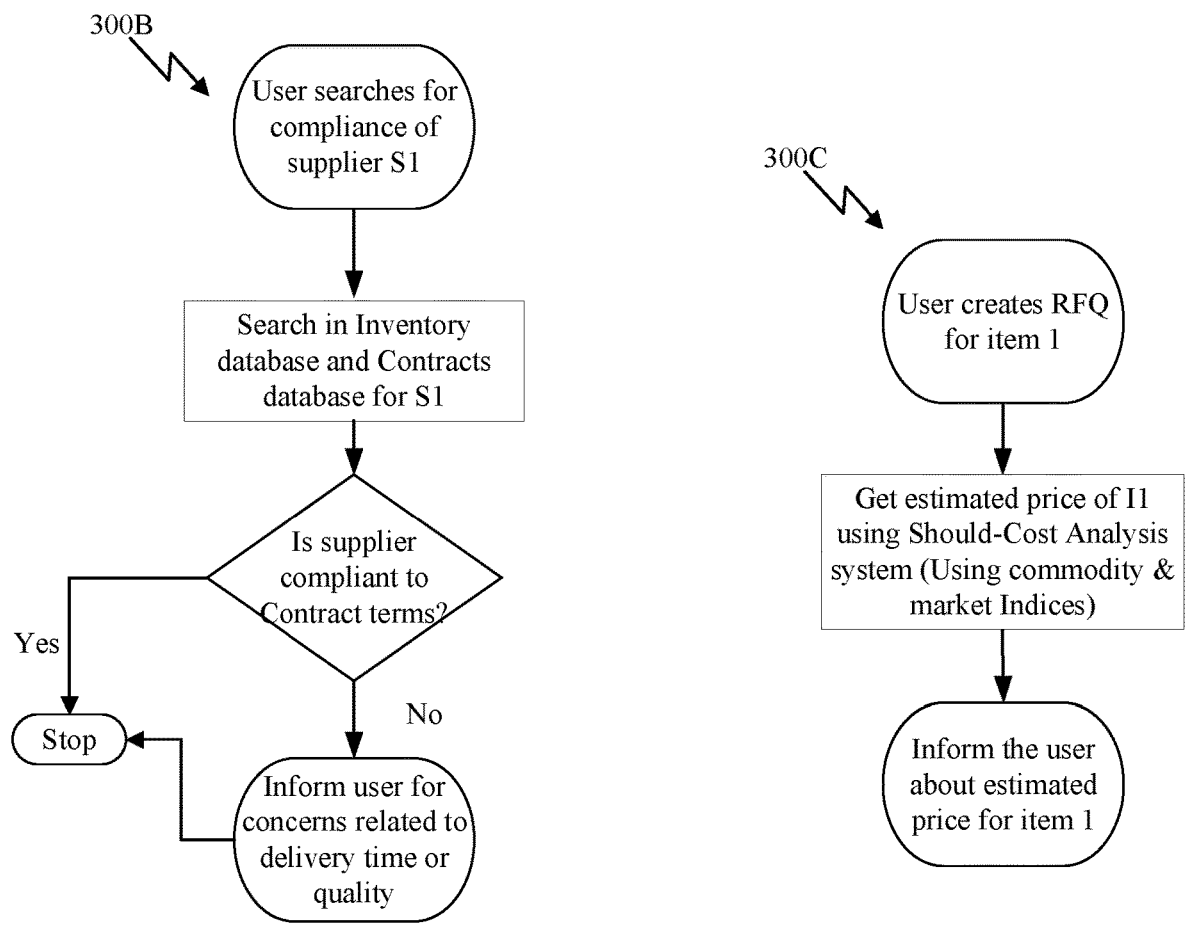
FIG. 3B is a flow chart depicting a supplier compliance processing task in accordance with an embodiment of the invention.
FIG. 3C is a flow chart depicting price negotiation of items as a processing task in accordance with an embodiment of the invention.
Figure 3D:
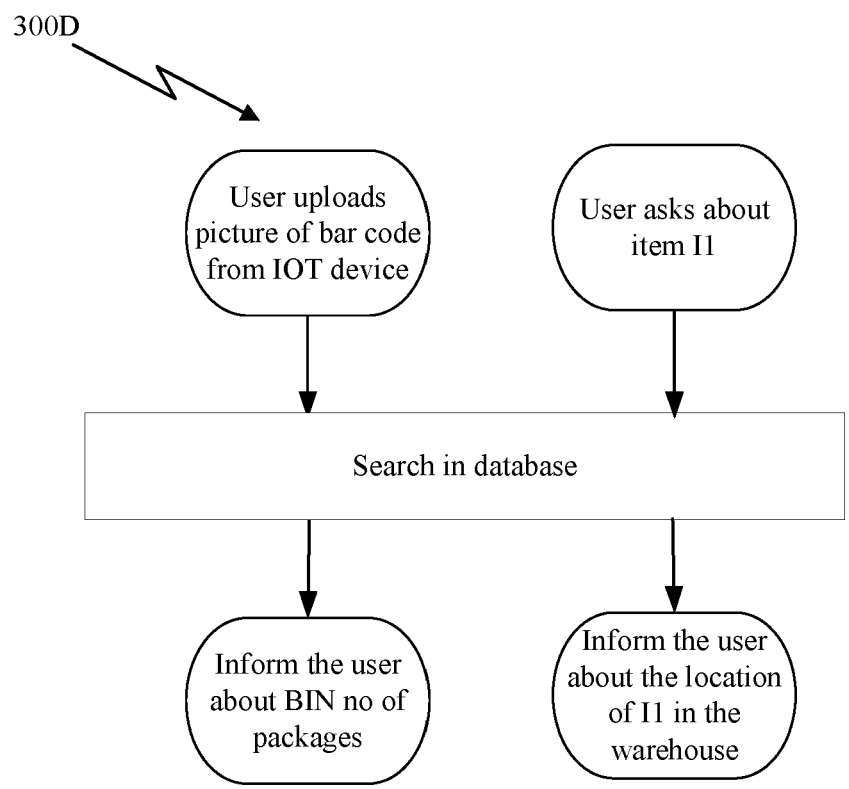
FIG. 3D is a flow chart depicting warehouse management as a processing task in accordance with an embodiment of the invention.

Referring to FIG. 3B, a flowchart 300B depicting a supplier compliance processing task is shown in accordance with an embodiment of the invention. The Chatbot can leverage inventory data (material receipt date, Batch Sample testing data) and contract data to create reports on supplier compliance in terms of delivery time and quality. Chatbot can notify appropriate category manager at real time about performance issues about a supplier.

Referring to FIG. 3C, a flowchart 300C depicting price negotiations of items as a processing task is shown in accordance with an embodiment of the invention. During RFQ (request for quotations) phase a user may want to know if the supplier is quoting a fair price for the item. For a list of items, the chatbot can leverage the commodity monitoring system to draw the latest raw material prices. These prices are then fed to the should cost analysis system and the fair price of the commodity is calculated. The chatbot can then respond back to the user with the system generated price. The chatbot can leverage commodity monitoring (Market indices, commodity indices) system of raw materials to notify category manager for potential re negotiation touch points.

Referring to FIG. 3I), a flowchart 300D depicting warehouse management as a processing task in accordance with an embodiment of the invention. In a warehouse, packages can be misplaced. In case a user comes across a package, user can ask the chatbot for help. The user can upload a picture of the package capturing the bar code. The bot can read the bar code and guide the user on the bin number of the package. Users can ask the chatbot about the location of specific products.

Figure 3E:
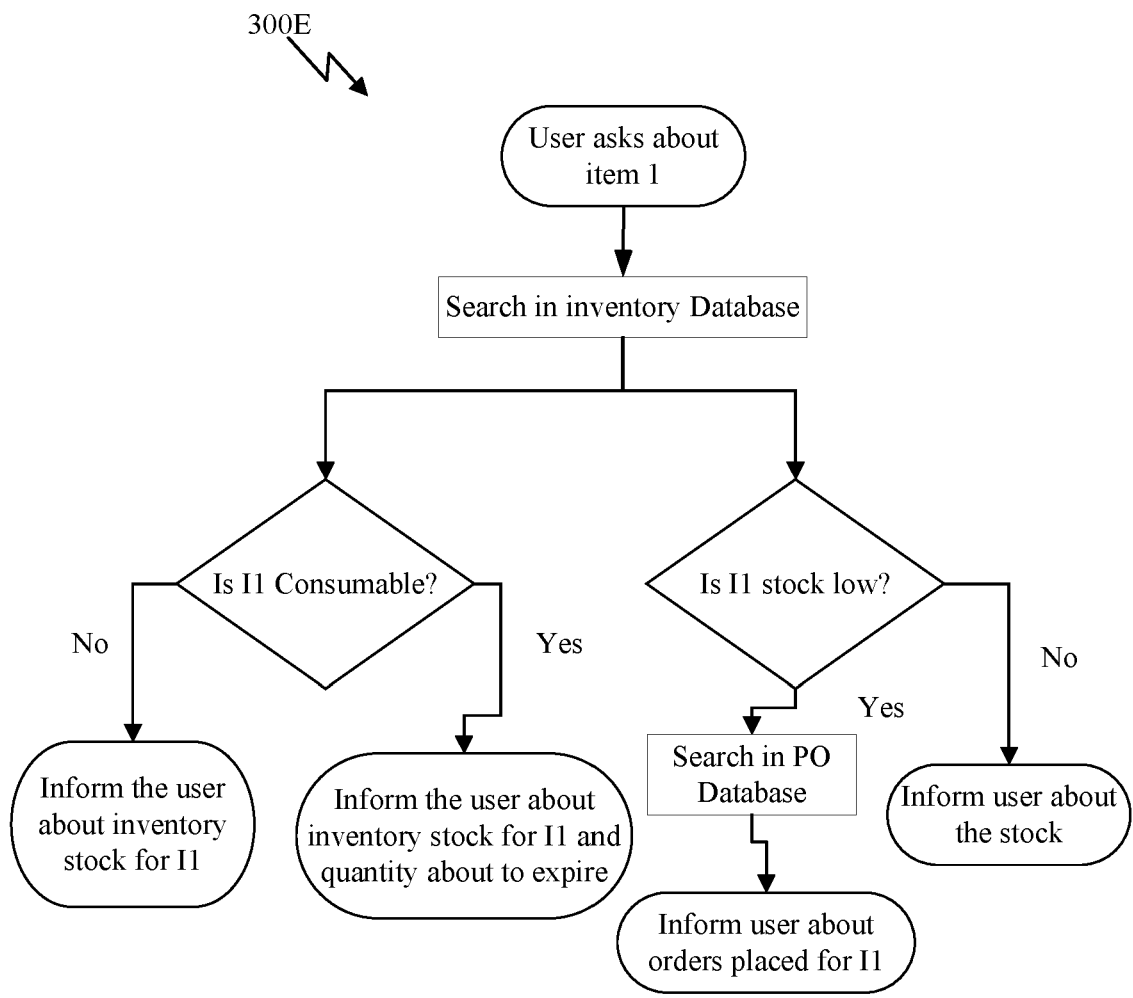
FIG. 3E is a flow chart depicting inventory management as a processing task in accordance with an embodiment of the invention.

Referring to FIG. 3E, a flowchart 300E depicting an inventory management processing task in accordance with an embodiment of the invention. The user can ask the chatbot for stock quantity of specific product. The chatbot can leverage inventory database to update user on health of stock for the item. Further, the chatbot can identify the intent of the user from the generated query and using AI engine the chatbot can automatically leverage a purchase order database to notify user on order placed for low stock items, so that the user is aware if the particular item has already been placed for procurement, even though the user may not have specifically asked for it. The data relationship model of the data model database enables processing of the received data string or the SCM action, to enable the chatbot in predicting the related SCM scenarios for recommending further action based on relevant data extracted from the databases.

Figure 3F:
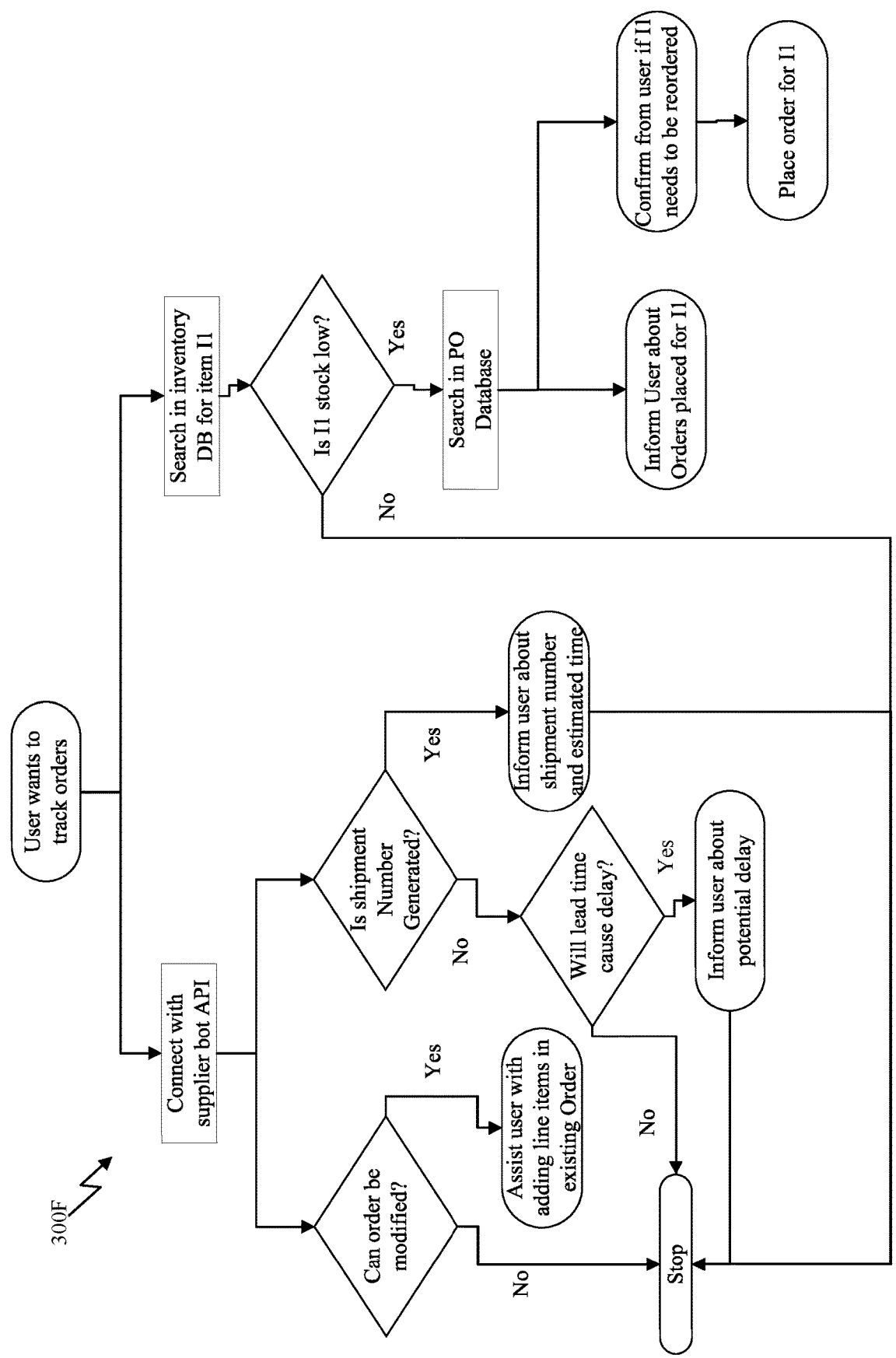
FIG. 3F is a flowchart depicting order management as a processing task in accordance with an embodiment of the invention.

Referring to FIG. 3F, a flowchart 300F depicting an order management processing task in accordance with an embodiment of the invention. The chatbot can perform repetitive tasks like reorder. Based on inventory quantity, chatbot can suggest user for placing a reorder. Once confirmed, chatbot can fetch latest historical orders and place orders. The chatbot can interact with Supplier bots to track order and shipment status. Based on set thresholds of lead time, chatbot can notify purchaser on potential delay in case supplier has not generated a shipment number. Chatbot can assist user for adding line items to existing orders by checking the order status in client database. To track the order status at supplier side bot can integrate with supplier bot or guided voice messages to check the eligibility status and assist the user.

Figure 3G:
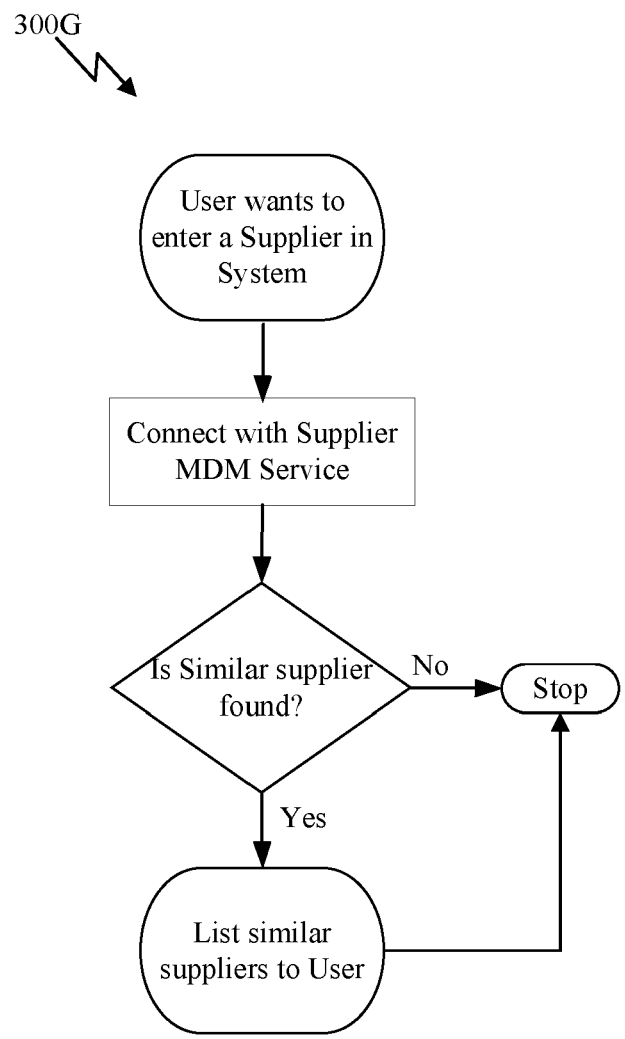
FIG. 3G is a flowchart depicting de-duplication as backend processing task in accordance with an embodiment of the invention.

Referring to FIG. 3G, a flowchart 300G depicting de-duplication as backend processing task in accordance with an embodiment of the invention. One of the key elements of Supplier master data management system is to stop duplicate entries being injected into the system. When a user is entering a supplier record in the system, the chatbot can compare the entered record with the existing Supplier database and prompt the user of potential duplicates. The chatbot will connect to the client specific Supplier database and server Supplier Database to track information of Parent and child Companies, addresses, and email formats to increase the accuracy of duplicate scoring. The chatbot will notify user about potential duplicates and present the user with a list of already existing suppliers. The chatbot publishes notification in real time on the interface where the user is trying to enter a new supplier name thus reducing duplicates and increasing productivity.

In an example embodiment, the system and method of the present invention provides a method for capturing voice commands from a chatbot user, converting them into text using a speech to text converter, a backend bot performing an intent (fetch report, find a supplier, small talk, help desk, create a document, find an item, etc.) classification using a data model which is trained on chatbot historical database, directing the received data string to the sub-network based on the type of query in the data string or the details related to the SCM action.

In an exemplary embodiment, the system and method of the present invention train one or more data models on enterprise application historical database and chatbot historical database. The invention includes extracting entities from the data string, checking it with a historical database and prompt the user for more inputs in case more information is required to process the query or alternatively trigger the sub-network for fetching relevant data. The sub network enables capturing of all responses and retrain the personalization (PZ) and wisdom of crowds (WOC) components. This enables the system to provide personalized experience to users going forward. Once all required information is received from the user, the chatbot processes the task by extracting information from multiple databases (Sourcing, RFX, Catalog, P2P, Reports, Contract, Spend) and responds to the data string. The system also prompts the user for feedback and integrates the feedback to optimize its PZ and WOC components.

In an embodiment, the system and method of the invention includes identification of intent of the user from the received data string. The chatbot sends the received data string to a data classification model which is trained based on data sets accumulated from multiple application and data sources related to the SCM EA and frequently asked questions in SCM functions. The data is grouped and labelled into various intents. Since, a user can use multiple representations of same entity, for eg; Supplier can be called vendor, contractor, distributor, dealer, a SCM domain specific synonym knowledge base is used to further enrich the data.

The intent of a data string is dependent on the sequence of words and the words present in the data string. Each word is mapped to a feature space that captures the syntactic and the semantic meaning. A word embedding is trained where each word is mapped to a D dimensional vector. Further, a recurrent Neural Network (RNN) is implemented to perform multiclass classification where each class corresponds to an intent. Referring to FIG. 4, a table 400 showing sample data string related to enterprise application SCM functions is provided in an example embodiment of the invention.

In an embodiment, the chatbot can help user to build reports interacting with the bot via speech or by text. User can ask a SCM query to the bot. The AI engine breaks the query into multiple phases like Phase 1: Understanding the entities and filters from the user query and mapping it to a predefine template and Phase 2: Reading these templates and generating dynamic queries to query the data base and populate the relevant data or recommended action. The AI engine identifies text chunks which are data attributes from the data string and perform data enrichment on the attributes by passing them through a SCM specific synonym master (eg: Vendor is synonym to Supplier). Further, data enrichment of attributes is performed by checking in the client database for columns names consisting of those attributes and predicting the cube which can best respond to the data string. The AI engine predicts the template based on the data scripts that can be understood by a dynamic query generator for enabling the generator to query one or more database to extract the relevant data.

It is pertinent to note that, a data string and query from the query generator can have several attributes of interest such as column names, filter conditions (top 10, latest, bottom most, first), entity names in columns, grouping logic (sum of, count of, average), date filters (last year, next month, last 3 months, this year). A word or token is an atomic unit in text processing and needs to be mapped to a feature space that captures its semantic and syntactic meaning. This achieved by training word embeddings where each word is mapped to a vector of dimension D. This D-dimensional embedding space captures the relationship between different words in the vocabulary. The word embeddings are trained using the fast-text framework that relies on a skip-gram model. In a skip-gram model, the word embedding of a token is mapped through a transformation to predict the word embedding vectors of its surrounding tokens. Fast-text also models each word by using character n-grams. This is useful to capture the subtle differences between words having either the same suffix or prefix. The vocabulary and training corpus for word embeddings is obtained by using the text present in a database of historical reporting questions asked by users. This is to ensure that the word embedding space is specific to Supply chain domain text i.e. it captures the grammatical structure and semantic meaning of words, sentences present in SCM questions.

Figure 4A:
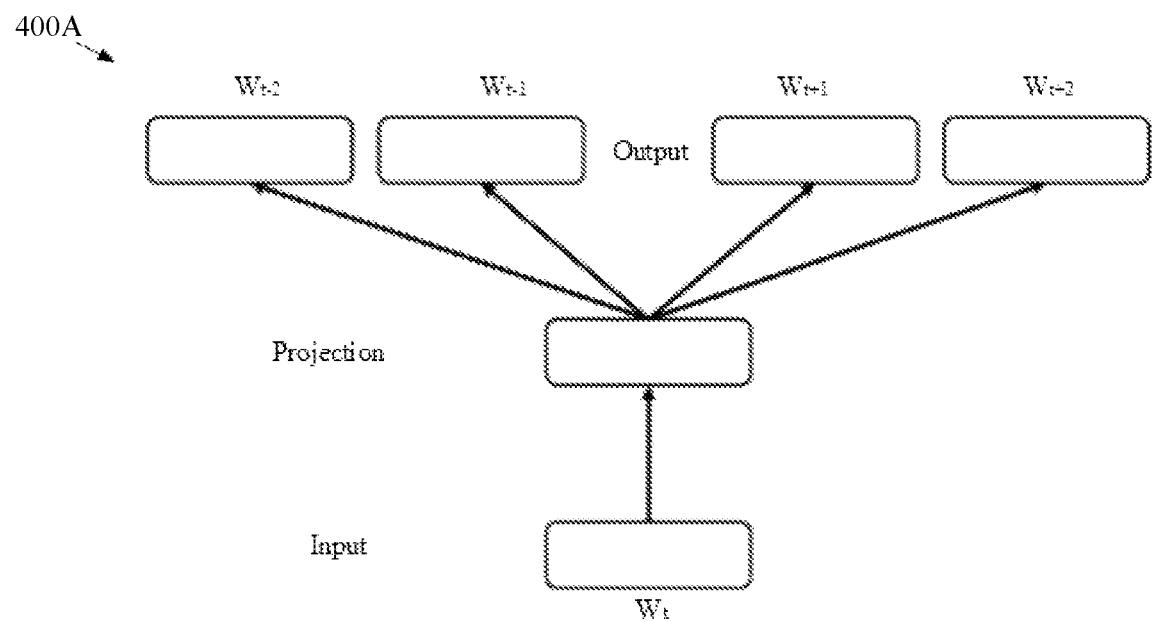
FIG. 4A is a skip-gram model of word embeddings in accordance with an embodiment of the invention.

Referring to FIG. 4A, provides a skip-gram model 400A of word embeddings in accordance with an example embodiment of the invention. The semantic relationship of words is encoded in the embedding space in the form of similar vectors. The word embeddings are trained using the skip gram model where the current word embedding is used to predict the word embedding of the surrounding context. The extraction of Words is followed by several downstream tasks that rely on the use of Natural Language Processing (NLP) with deep learning algorithms. A word or token is an atomic unit in text processing, and it is mapped to a feature space that captures its semantic and syntactic meaning. This achieved by training word embeddings where each word is mapped to a vector of dimension D. This D-dimensional embedding space captures the relationship between different words in the vocabulary. The word embeddings are trained using the fast text framework that relies on the skip-gram model 400A. The word embedding of a token is mapped through a transformation to predict the word embedding vectors of its surrounding tokens:

$$\mathcal{L}_{skip-gram} = \sum_{n=0}^{N} \sum_{c \in C_n} \log(p(w_c|w_n))$$

where $L_{skip-gram}$ is the loss function used to train the word embeddings, context $C_n$ with words $w_c$ is the set of indices for words surrounding the target word wn. Fast-text also models each word by using character n-grams. For the training of embeddings all n-grams are extracted for n>=3 and n<6. Each n-gram is associated with a vector $u_g$, leading to the following scoring function is:

$$s(w, C_w) = \sum_{g \in G_w} u_g^T v_{C_w}$$

where $G_w$ with n-grams g are the set of n-grams per word w, $C_w$ is the context for the word w. This is crucial to capture the subtle differences between words having either the same suffix or prefix. The vocabulary and training corpus for word embeddings is obtained by using the text present in the historical database. This is to ensure that the word embedding space is specific to object text i.e. it captures the grammatical structure and semantic meaning of words, sentences present in characteristic description of the object.

In one example embodiment, one of the components of the chatbot is the extraction of attributes using machine learning. This is formulated as Named-entity recognition (NER) where each token in the text is given one of three tags BIO i.e. B for beginning, I for in between and O for outside. The first token corresponding to the attribute is given a B tag, the remaining attribute tokens are given a I-tag and all the remaining non-attribute tokens are given the O tag. The input to the network is a sequence of tokens and the output is a sequence of BIO tags with one tag corresponding to one token. The RNN model contains an embedding layer that maps the vocabulary index of a token to an embedding vector. The sequence of embedding vectors is then input to a bidirectional long-short-term memory (Bi-LSTM) layer which encodes the surrounding context of each token as output. The output of Bi-LSTM is then passed through a dense layer for further encoding and finally passed through a soft-max layer to output a sequence of probability distributions over the three candidate tags. A tag is assigned to each token that has the maximum probability assigned to it.

In an exemplary embodiment, a convolution neural network is used for classification that focuses on presence of keywords rather than sequence for feature extraction in case the data sting includes a spend description which is a short text containing a series of keywords without grammatical structure. One-dimensional convolutions are performed on the sequence of word embedding vectors provided as inputs. Each convolution operation is referred to as a filter h and has a filter width w. The one-dimensional convolution operation for a word sequence f is given by:

$$(f \star h)(m) = \sum_{i=0}^{w} h[i] f[m-i]$$

Figure 4B:
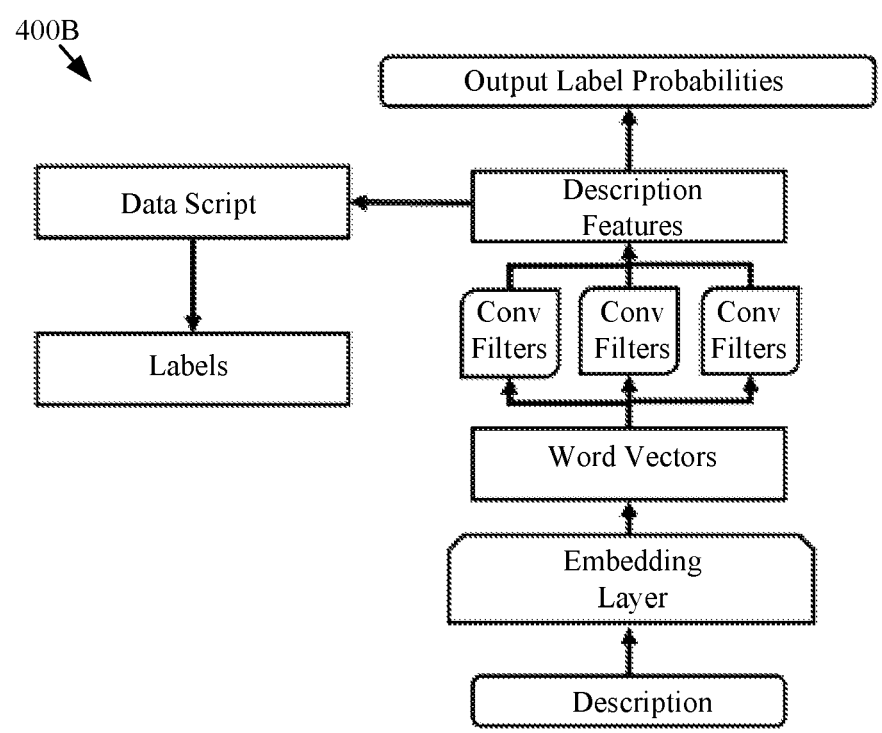
FIG. 4B is a block diagram of data classifier in accordance with an embodiment of the invention.

Three different window widths with plurality of filters (eg: 128 filters) for each window width are used. This ensures filters learn for different n-grams in a training dataset. The model output is a Softmax layer with a size equal to the number of categories present. The block diagram providing different components of the data classifier including the intent data classifier are shown in FIG. 4B. The categorical cross entropy (CE) loss function is used for computing the gradients for training the network.

In another embodiment, a synonym library is compiled by consolidating procurement specific terminology and synonyms from application wide column names. The synonyms library is created by the AI engine based on the learnings from the historical datasets. The AI engine processes the data script to pulls out columns, perform matching against the synonym library and populates a dictionary of column name and respective synonym. The data string may contain data attributes in native terminology. This native terminology may not match to an actual column name in the database. The system refers to entity specific column dictionary to map the native term to its respective column names. Ex: vendors is replaced by the column Supplier Name. Further, attributes in the data string can refer to values inside the column. The system refers to a master database to pull out column names to which the value belongs to. The database can have lot of columns matching the part of the attribute. To remove the noise a text distance matching algorithm is used on top of the results returned by the database. The distance matching algorithm is a combination of similarity, longest common subsequence, and length of longest common substring. Then a weighted average of the scores is taken and a column candidate is treated as a valid option if the weighted average score exceeds a pre-defined threshold.

In another embodiment, reports can be fetched for SCM functions in the ERP system. The data resides in database. For each function of the SCM application including but not limited to Contract, Spend etc., data resides in individual databases. Since, multiple users will have different roles in organization, they will have access to only a subset of data. Each subset of data in called a cube and a cube is a subset of columns from the database. The users can have access to multiple cubes having overlapping columns. Given a set of text chunks which represent potential column names and a set of columns names detected in step 3 and step 4, the bot needs to decide a cube which can respond to the data string. Each standard report is a collection of columns from cubes. They system deploys a cube predictor module that extracts the report—column—cube mapping from these standard reports.

In an embodiment, all data attributes for which there can be multiple options the chatbot responds to the user with ambiguities and takes inputs from the user. Once the user selects an option for an ambiguity, the bot saves the user preference in the user personalization section. This is used by the bot to auto resolve ambiguities the next time. As multiple users use the system and resolve ambiguities the bot tracks and learns from multiple user preferences. This is updated in the wisdom of crowds section. If more than N users resolve an ambiguity and make the same choices, then bot learns it and auto resolves ambiguity for a new user. Once all ambiguities are resolved the bot populates a template which is read by the dynamic query builder. The Dynamic query builder generates a query and then triggers the database for response.

Figure 5:
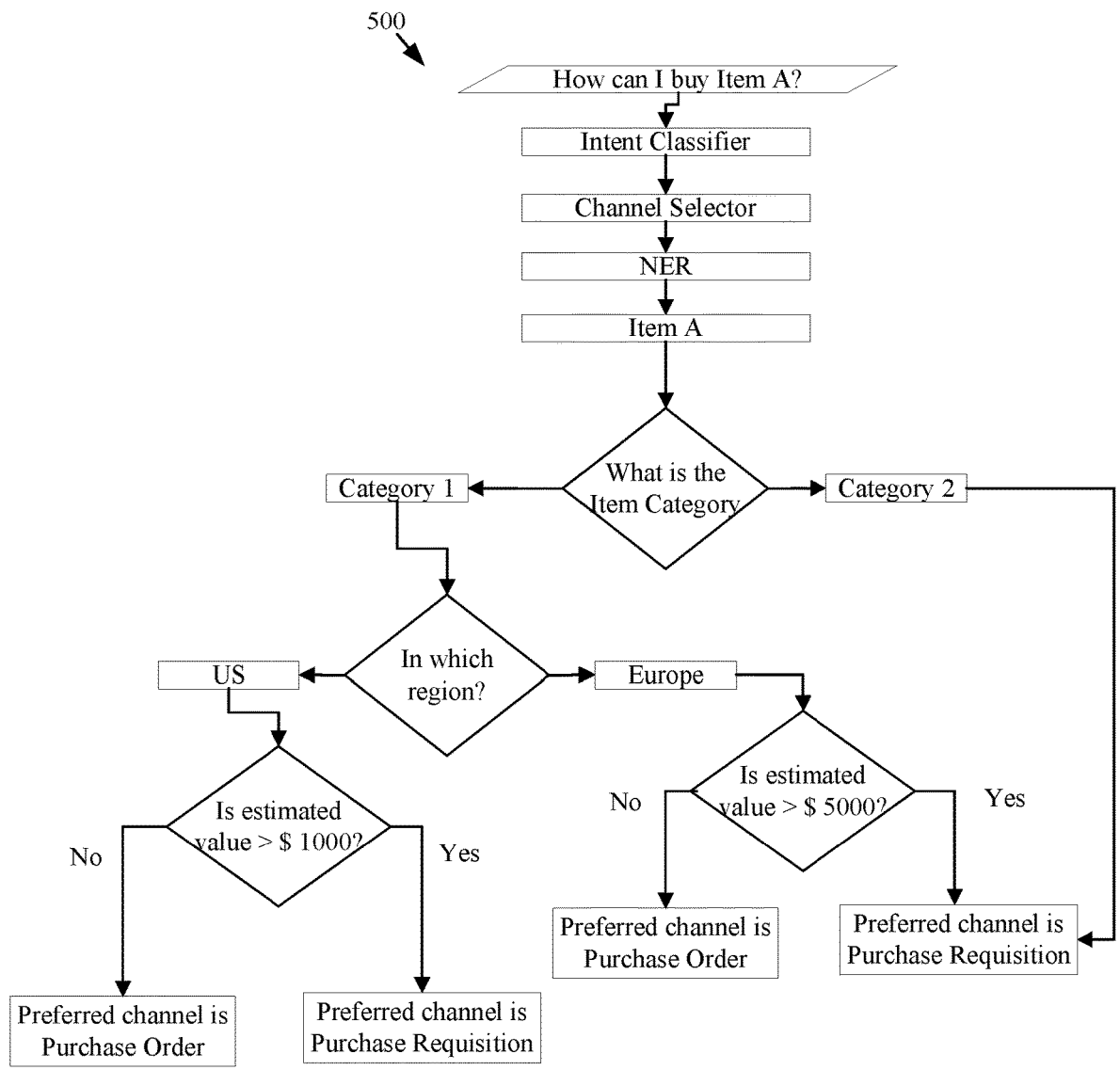
FIG. 5 is a flowchart depicting the selection of a buying channel in accordance with an example embodiment of the invention.

In an advantageous aspect, the data processing system and method of the invention enables the chatbot to recommend suppliers in response to a data string conveying a query. For eg: if the data string includes "I want to fix a water leak", the chatbot would not only respond with the relevant data but would also process classified datasets and recommend suppliers mapped to a category related to the data string query. Further, the invention enables the chatbot to select appropriate processing channel. Since buying an item is a complex activity, the same item can be bought through multiple channels, for e.g, by raising a catalog-based purchase order, non-catalog-based purchase order, creating an RFX, raising a purchase requisition etc. It is a complex task to understand rules for deciding best buying channels and the AI engine enables processing of the data script by the processor for selecting the appropriate buying channels in the enterprise application through recommendation of the chatbot. Referring to FIG. 5, a flowchart 500 depicting the selection of the buying channel is shown in accordance with an embodiment of the invention.

Figure 6:
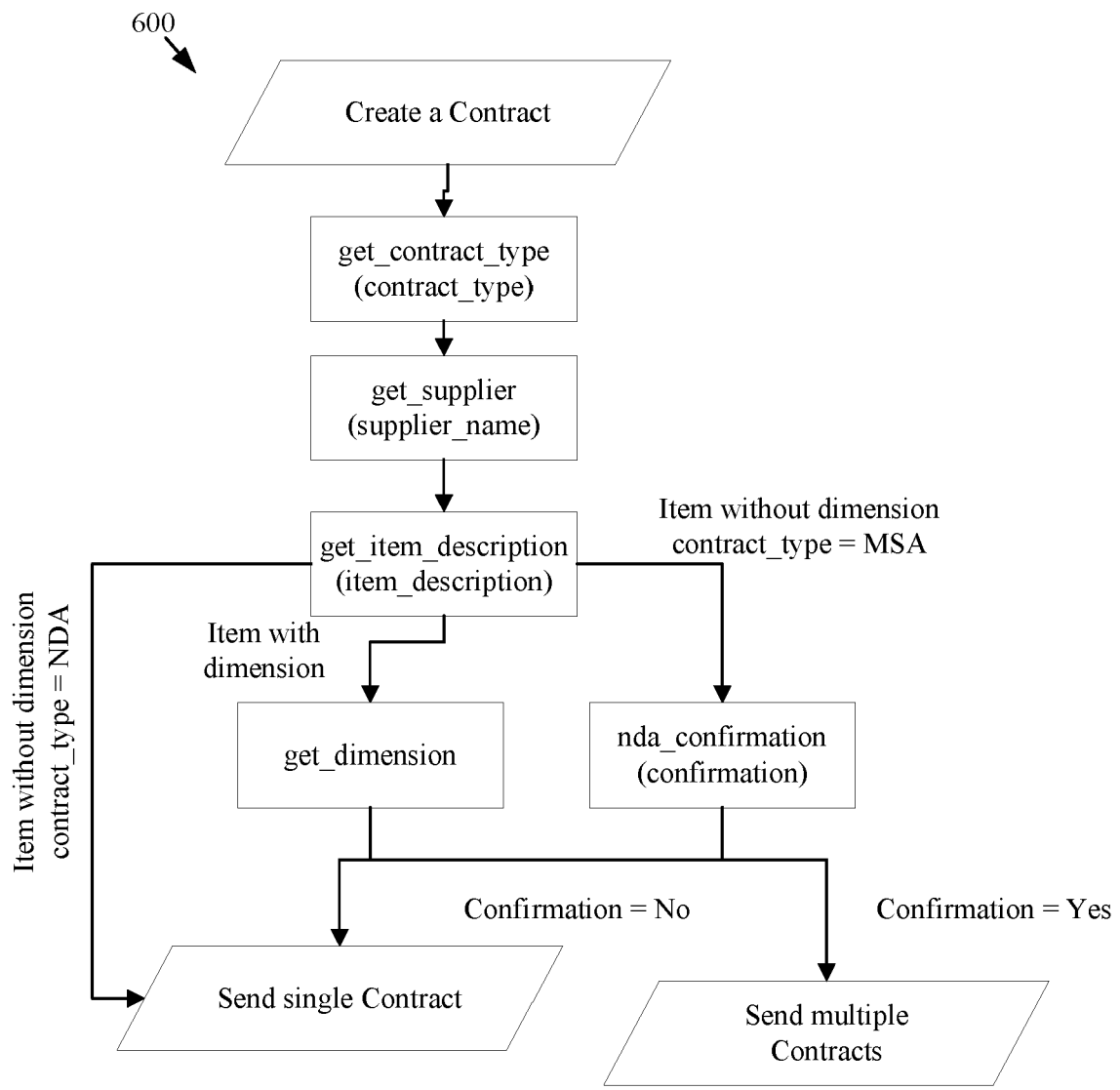
FIG. 6 is a flowchart depicting creation of contract through chatbot in accordance with an embodiment of the invention.
Figure 6A:
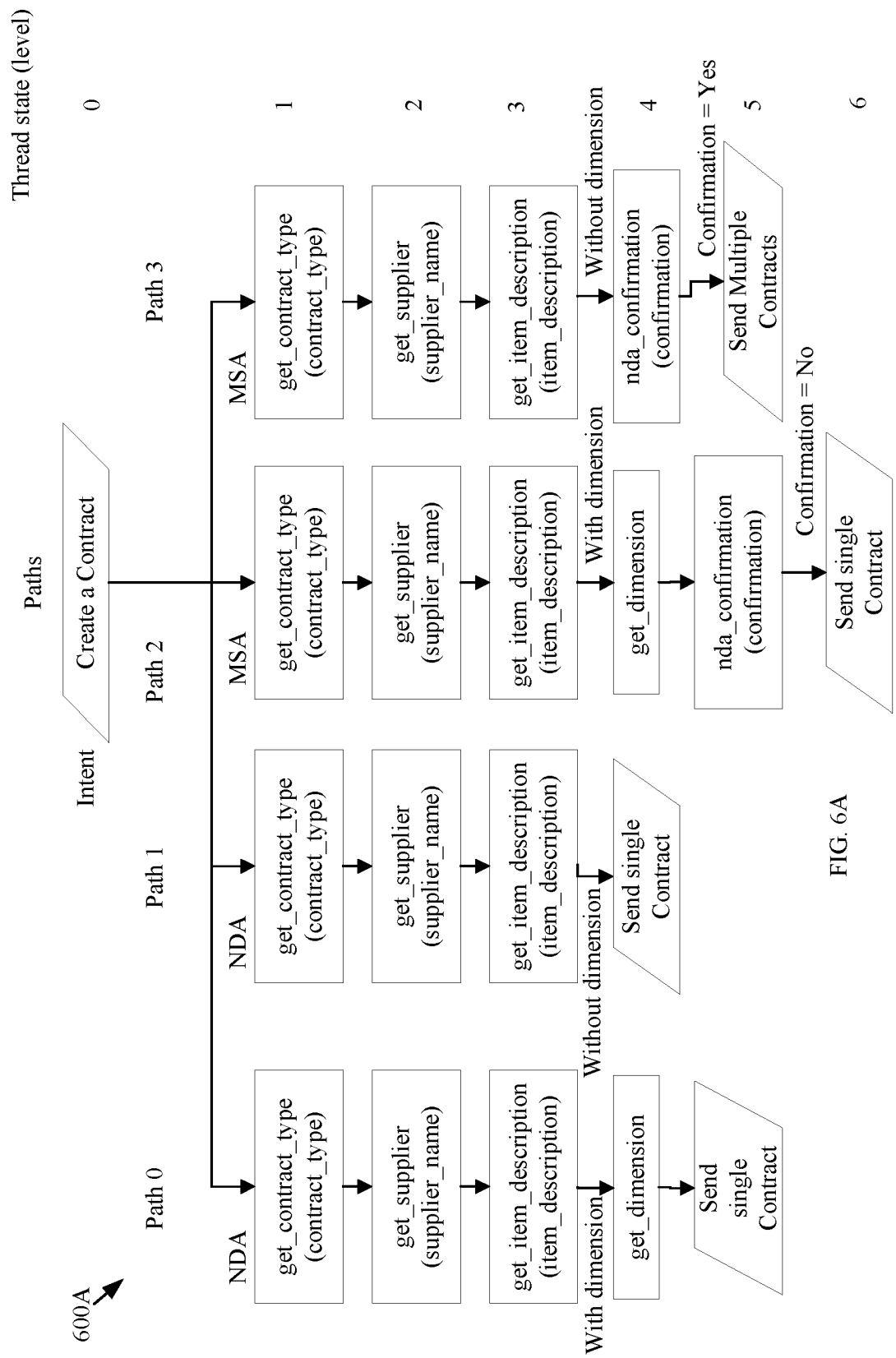
FIG. 6A is a chatbot conversation tree in accordance with an embodiment of the invention.

Referring to FIG. 6, a flowchart 600 depicting creation of contract through the chatbot by defining the state and path from the data string to identify the intent. The State of a data string is defined as the level (stage) in the chatbot conversation tree 600A (Ref. FIG. 6A) where the user is currently present. Since intent is always the root node of the tree, its state (level) is always 0. As one moves down a level, the state increases by 1. The data string can be indicative of multiple paths to be followed based on the inputs received by the user. Each path begins with an intent and ends at the bottom-most node of conversation tree which depicts the outcome. The default path for any execution is always 0. All the possible flows of the conversation are represented as separate paths in the tree. Each level of the tree is a new state/stage. We assign 0 state value to the intent which initiates the conversation and increment it by 1 as we go down a level in the tree towards the bottom most nodes. This metadata gets setup in a database and is used to follow the correct paths of conversation.

In an example embodiment, the data string is processed to identify the intent of the user by an intent classifier. The intent could be to buy an item or service or create a contract or something else to be executed through the enterprise application. Based on the identified intent, the system determines the data tree to be utilized as conversational tree. This information is saved in a document in data analytics tool and the path being followed as 0 along with state as 0 is stored. Using NER, the AI engine extracts useful entities and determine their type. These entities could affect the path being followed in the chatbot conversation. All entities are also saved in the same document being used for the conversation. The system can verify these entities using a custom action and identified using the metadata objects saved from the data tree. Once entities are extracted from the text, it is determined if the entity can change the path of the conversation using the data tree. From the historical database, the response that needs to be shown to user on the interface is fetched based on the new path and state value. Further, Certain stages of the conversation may require special instructions and such instructions are called custom actions. The system executes these custom functions and then proceed with sending the bot response or updating the bot response we identified earlier based on the associated custom action. These custom actions can include validating an input, connecting with an external database, calling an API or creating/fetching a document. For eg: The User is creating a contract which is the conversation end as well; or the preferred buying channel for an item would be dictated by parameters including user's region, Users associated Business Unit and category of the item. The custom functions call the APIs to fetch this information.

In an example embodiment, the system executes a supplier risk notification processing task. The chatbot sends a customized notifications to users on supplier risk. The system maintains a list of related Supplier to a user. For a logged in user, the system would track the purchase orders, invoices, contracts and all documents the user has interacted over a period of time, say, in the last "n" months. The system will extract the supplier names from the documents and segment them as high significance suppliers to the specific user. Significance will be associated with a decay function of time and net value of the transactions. Significant suppliers will be matched in the supplier knowledge graph (SKG). SKG is a graph database which tracks information of supplier, region, latest news articles related to the supplier, risk profile score. The risk profile score is calculated by a risk profile engine which scraps news articles related to the supplier and calculate risk associated to the supplier and region by looking for information related to earthquakes, pandemic, labor strikes, floods, ranking of supplier by global agencies and related parameters. Once the risk associated with the supplier exceeds a certain threshold notifications alert would be trigged to the user.

In an embodiment, the chatbot is configured to consider dynamically changing parameters such as key information obtained from live newsfeeds. The AI engine processes the newsfeed to draw relevance from the content and provide actionable insight to a user. Alternately, the system is configured to assign weights to type of news feeds and impact of certain news on supply chain to auto rate the scenario and modify the sourcing strategy or supplier recommendation for executing the recommended strategy. The AI engine processes the newsfeed based on a data script configured for understanding the content and relating it to impact characteristics in real time. For Eg., if the supplier is involved in certain type of litigation in a Jurisdiction which may impact the execution of strategy, then the chatbot may alert the user to exclude the supplier from the list depending on the parameters preferred by a user. The processing of live news feed providing such information is extremely useful in ensuring risk free sourcing process for an entity through the enterprise application. Further, in an advantageous aspect, the cognitive aspect of the invention enables a user to override an auto assessment by the chatbot if required.

In another example embodiment the chatbot is trained from a list of predefined SCM datasets including Supply chain related questions and responses. Each question and response pair would be clubbed to form a paragraph. This would be treated as the corpus for this task. The sentence to vector model is trained on the corpus. For an incoming data string, which is classified as belonging to Help class, will be converted into vector using the sentence to vector model. A cosine similarity is calculated in between the user question and vectorized documents in the corpus. The highest similar result if crosses a set thresh hold is returned to the user.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A data processing method for enterprise application chatbot, the method comprises:
receiving one or more data strings or initiation of an SCM action from a user through an electronic user interface of the enterprise application;
parsing intent of the user from the received one or more data strings or the SCM action by a processor coupled to an AI engine wherein one or more one data scripts are identified based on the parsed intent to trigger one or more processing task wherein parsing intent of the user based on the SCM action includes predicting one or more SCM Scenarios intended to be executed by the user wherein a bot identifies one or more nodes of a SCM network linked to the SCM action and the one or more SCM scenarios for parsing the intent and wherein one or more dataset elements associated with the SCM action executed on the interface are analyzed by the bot to determine accuracy of the predicted one or more SCM Scenarios;
embedding data specific to the one or more processing task on the identified data script to generate one or more relevant data; and
sending the relevant data by the chatbot to the enterprise application interface in response to the received one or more data strings or the SCM action for enabling the user to make an informed decision, wherein the one or more data scripts executes the processing task based on at least one data model trained on one or more historical dataset for predicting and extracting the one or more relevant data from a historical database.

2. The method of claim 1 wherein the processing task includes data analytics task, inventory management task, fault detection in SCM data objects such as Purchase orders, contract data processing for assessment of supplier compliance, commodity monitoring for negotiations, warehouse and inventory management, identification of duplicate data, order management, planning and optimization of logistics, opportunity finders, purchase fraud detection, and price negotiation of items or collections of items.

3. The method of claim 2 wherein the relevant data includes recommended action based on processing of the historical dataset, notification to a user or an auto-task processing object of the enterprise application for enabling a bot to trigger an action based on content of the notification, approvals through SCM data objects in SCM applications.

4. The method of claim 2 further comprises
generating by a bot the one or more data scripts created for performing the one or more processing task by utilizing a library of functions stored on a functional database, wherein the data scripts are backend scripts created by the bot based on the intent of the received data string or initiation of the SCM action, and AI processing for enabling automation of the processing tasks.

5. The method of claim 4 wherein a control unit identifies and selects an artificial intelligence based dynamic processing logic using the bot to execute the one or more processing tasks.

6. The method of claim 5 wherein the at least one data model is generated based on data enrichment of historical dataset, wherein a method of data enrichment includes the steps of:
receiving a labelled dataset;
cleansing the received labelled dataset by removal of special characters, tokenization of labelled dataset after removal of special characters and removal of stop words from the labelled dataset to obtain a normalized dataset;
dividing the normalized dataset into training dataset and testing dataset;
subjecting the training dataset to fine tuning by a bidirectional machine learning technique (MLT) on top of a reading comprehension dataset;
generating the one or more data model based on the training dataset and the testing dataset;
generating a prediction dataset for the testing dataset using the training data set through the one or more data models;
providing the prediction dataset as input to a neural network and testing data as output to identify one or more data attribute weights for determining accuracy of the prediction dataset; and
in response to determination of accuracy to be above a threshold value, storing the dataset in the historical database.

7. The method of claim 6 wherein the historical database is a chatbot historical database having historical dataset related to conversations or an enterprise application historical database having historical dataset related to supply chain data or both.

8. The method of claim 7 wherein the at least one data models is trained by
extracting a plurality of categories from the normalized dataset for creating taxonomy of classification;
extracting a plurality of distinct words from the normalized dataset to create a list of variables;
transforming the normalized dataset into a training data matrix using the list of variables, and
creating a training data model from the classification code vectors and the training data matrix by using the machine learning engine (MLE) and the AI engine for training the at least one data model.

9. The method of claim 8 wherein the bidirectional machine learning technique includes deep learning models configured to mask one or more elements of the dataset and enhance remaining elements of the dataset for processing wherein the elements for processing are identified by contextual analysis of the dataset.

10. The method of claim 9 wherein the reading comprehension dataset enables processing of unknown elements from the identified elements of the dataset wherein the AI engine processes the labelled dataset with known and unknown elements.

11. The method of claim 1 wherein the data string and the initiated SCM action are inputs to the processor as a text input, a voice input, an image input or a combination thereof.

12. The method of claim 11 wherein the data string or the SCM action is mapped to a feature space that captures a syntactic and a semantic meaning wherein a word embedding is trained where one or more words of the data string or words of the action description is mapped to a vector and a Recurrent Neural Network (RNN) is implemented to perform multiclass classification where each class corresponds to at least one intent.

13. The method of claim 11 wherein the AI engine enables processing of the image input as data string by:
extracting one or more elements from the image received as input on the interface of the chatbot wherein a data extraction tool is configured to extract the elements by drawing a box around the elements based on a region of interest data script and cropping the elements for extraction;
sending the extracted one or more elements to an optical character recognition module for converting the extracted elements to a text data string; and
processing the converted elements by the AI engine coupled to the processor for identifying the intent and fetching relevant data from the historical database.

14. A data processing system configured for enterprise application chatbot, the system comprising:
a server configured to receive one or more data strings or initiation of an SCM action from a user through an electronic user interface of the enterprise application;
a processor coupled to an AI engine for parsing intent of the user from the received one or more data strings or the SCM action wherein one or more data scripts are identified based on the intent of the user to trigger one or more processing task wherein parsing intent of the user based on the SCM action includes predicting one or more SCM Scenarios intended to be executed by the user wherein the bot identifies one or more nodes of a SCM network linked to the SCM action and the one or more SCM scenarios for parsing the intent and wherein one or more dataset elements associated with the SCM action executed on the interface are analyzed by the bot to determine accuracy of the predicted one or more SCM Scenarios, wherein the processor is configured to embed data specific to the one or more processing task on the identified data script to generate one or more relevant data and send the one or more relevant data by the chatbot to the enterprise application in response to the received one or more data strings or the SCM action for enabling the user to make an informed decision, wherein the one or more data scripts execute the one or more processing tasks based on at least one data model trained on a historical dataset for predicting and extracting the one or more relevant data from a historical database.

15. The system of claim 14 wherein the processing task includes data analytics task, inventory management task, fault detection in SCM data objects such as Purchase orders, contract data processing for assessment of supplier compliance, commodity monitoring for negotiations, warehouse and inventory management, identification of duplicate data, order management, planning and optimization of logistics, opportunity finders, purchase fraud detection, and price negotiation of items or collections of items.

16. The system of claim 14 wherein the one or more relevant data includes recommended action based on processing of enterprise application historical dataset, notification to a user or an auto-task processing object of the enterprise application for enabling a bot to trigger an action based on content of the notification, approvals through SCM data objects in SCM applications.

17. The system of claim 16 further comprises the bot configured to generate the one or more data scripts created for performing the one or more processing task by utilizing a library of functions stored on a functional database, wherein the data scripts are backend scripts created by the bot based on the intent of the received data string or initiation of the SCM action, and AI processing for enabling automation of the processing tasks.

18. The system of claim 17 further comprises a control unit configured to identify and select an artificial intelligence based dynamic processing logic using the bot to execute the one or more processing tasks.

19. The system of claim 18 further comprises a data cleansing tool and a data enrichment tool configured for data enrichment of historical dataset from a historical database by:
receiving a labelled dataset;
cleansing the received labelled dataset by removal of special characters, tokenization of labelled dataset after removal of special characters and removal of stop words from the labelled dataset to obtain a normalized dataset;
dividing the normalized dataset into training dataset and testing dataset;
subjecting the training dataset to fine tuning by a bidirectional machine learning technique (MLT) on top of a reading comprehension dataset;
generating the one or more data model based on the training dataset and the testing dataset;
generating a prediction dataset for the testing dataset using the training data set through the one or more data models;
providing the prediction dataset as input to a neural network and testing data as output to identify one or more data attribute weights for determining accuracy of the prediction dataset; and
in response to determination of accuracy to be above a threshold value, storing the dataset in the historical database.

20. The system of claim 19 wherein the historical database is a chatbot historical database having historical dataset related to conversations or an enterprise application historical database having historical dataset related to supply chain data or both.

21. The system of claim 20 wherein the at least one data model is trained by
extracting a plurality of categories from the normalized dataset for creating taxonomy of classification;
extracting a plurality of distinct words from the normalized dataset to create a list of variables;
transforming the normalized dataset into a training data matrix using the list of variables, and
creating a training data model from the classification code vectors and the training data matrix by using the machine learning engine (MLE) and the AI engine for training the at least one data model.

22. The system of claim 14 wherein the data string and the initiated SCM action are inputs received at the server as a text input, a voice input, an image input or a combination thereof.

23. The system of claim 22 further comprises
one or more IOT devices configured to provide the inputs to the server on initiation of the SCM action wherein the IOT devices include sensor, mobile, camera, Bluetooth, RF tags and similar devices or combination thereof.

24. The system of claim 23 wherein the AI engine integrates deep learning, predictive analysis, information extraction, planning, scheduling, impact analysis and robotics for analysis of the data string or SCM action to determine the intent.

25. The system of claim 24 wherein the inputs include inventory management data or warehouse management data or data related to one or more item for procurement or performance data of procured items.

26. The system of claim 25 further comprises
a real-time impact assessment module connected to the chatbot of the enterprise application wherein the impact assessment module is configured to received impact data with multiple processing parameters including natural calamity, fluctuation in market indices, social sentiments, logistics, political crisis and policy changes through labor laws, taxation, economy, import & export policies, international trading laws, customer satisfaction survey and technology improvements that may impact one or more functionalities of the EA wherein depending on the impact of the parameters on the enterprise application the chatbot recommends the appropriate action or generates the relevant data as graphs on the interface to enable a user to take informed decision.

27. The system of claim 22 wherein the AI engine enables processing of the image input as data string by:
extracting one or more elements from the image received as input on the interface of the chatbot wherein a data extraction tool is configured to extract the elements by drawing a box around the elements based on a region of interest data script and cropping the elements for extraction;
sending the extracted one or more elements to an optical character recognition module for converting the extracted elements to a text data string; and
processing the converted elements by the AI engine coupled to the processor for identifying the intent and fetching relevant data from the historical database.

28. A non-transitory computer-readable storage medium coupled to one or more processors and having instructions stored thereon which, when executed by the one or more processors, cause the one or more processors to perform data processing operations for enterprise application chatbot, the operations comprising:
receiving a data string or initiation of an SCM action from a user through an electronic user interface of the application;
identifying intent of the user from the received data string or the SCM action by a processor coupled to AI engine, wherein one or more one data script is identified based on the intent of the user to trigger one or more processing task wherein parsing intent of the user based on the SCM action includes predicting one or more SCM Scenarios intended to be executed by the user wherein a bot identifies one or more nodes of a SCM network linked to the SCM action and the one or more SCM scenarios for parsing the intent wherein one or more dataset elements associated with the SCM action executed on the interface are analyzed by the bot to determine accuracy of the predicted one or more SCM Scenarios;

embedding data specific to the one or more processing task on the identified data script to generate one or more relevant data; and sending the relevant data by the chatbot to the enterprise application in response to the received data string or the SCM action for enabling the user to make an informed decision, wherein the one or more data scripts execute the processing task based on at least one data model trained on a historical dataset for predicting and extracting the one or more relevant data from a historical database.

* * * * *